United States Patent
Jha et al.

(10) Patent No.: US 9,834,458 B2
(45) Date of Patent: Dec. 5, 2017

(54) PERFORMANCE ENHANCEMENT OF ELECTROCHEMICAL DEIONIZATION DEVICES BY PRE-TREATMENT WITH CATION EXCHANGE RESINS

(71) Applicant: HydroNovation, Inc., San Francisco, CA (US)

(72) Inventors: Anil D. Jha, San Francisco, CA (US); Ramandeep Mehmi, Livermore, CA (US)

(73) Assignee: HydroNovation, Inc., La Palma, CA (US)

( * ) Notice: Subject to any disclaimer, the term of this patent is extended or adjusted under 35 U.S.C. 154(b) by 0 days.

(21) Appl. No.: 14/375,391

(22) PCT Filed: Jan. 22, 2013

(86) PCT No.: PCT/US2013/022479
§ 371 (c)(1),
(2) Date: Jul. 29, 2014

(87) PCT Pub. No.: WO2013/116035
PCT Pub. Date: Aug. 8, 2013

(65) Prior Publication Data
US 2015/0027890 A1    Jan. 29, 2015

Related U.S. Application Data

(60) Provisional application No. 61/592,293, filed on Jan. 30, 2012.

(51) Int. Cl.
C02F 1/469       (2006.01)
C02F 1/66        (2006.01)
(Continued)

(52) U.S. Cl.
CPC ............ *C02F 1/4695* (2013.01); *B01D 61/44* (2013.01); *B01D 61/445* (2013.01); *B01D 61/48* (2013.01);
(Continued)

(58) Field of Classification Search
CPC ................. C02F 1/4693; C02F 1/4695; B01D 61/42–61/54
See application file for complete search history.

(56) References Cited

U.S. PATENT DOCUMENTS 6,056,878 A * 5/2000 Tessier .................. B01D 61/48
                                                      204/524
6,274,019 B1   8/2001 Kuwata
(Continued)

FOREIGN PATENT DOCUMENTS

CN      1311709 A    9/2001
EP      1068901 A2   1/2001
(Continued)

OTHER PUBLICATIONS

Extended European Search Report from European Application No. 13743091.4 dated Aug. 6, 2015.
(Continued)

*Primary Examiner* — Keith Hendricks
*Assistant Examiner* — Salil Jain
(74) *Attorney, Agent, or Firm* — Lando & Anastasi, LLP

(57) ABSTRACT

The methods and systems disclosed here relate to treating water. In certain embodiments, a treatment system comprises an electrochemical water treatment device, a recirculating concentrate stream in fluid communication with the electrochemical water treatment device, a flow control device in fluid communication with a first flow path comprising acidic water and configured to be in fluid communication with the recirculating concentrate stream, and a
(Continued)

second flow path comprising feed water and configured to be in fluid communication with the recirculating concentrate stream, and a control system in communication with the flow control device. The treatment system may further comprise a recirculating dilution stream in fluid communication with a second inlet and a second outlet of the electrochemical water treatment device.

11 Claims, 7 Drawing Sheets

(51) Int. Cl.
| | | |
|---|---|---|
| C02F 1/00 | (2006.01) | |
| B01D 61/44 | (2006.01) | |
| B01D 61/48 | (2006.01) | |
| B01J 39/05 | (2017.01) | |
| B01D 61/46 | (2006.01) | |
| C02F 1/42 | (2006.01) | |
| C02F 1/02 | (2006.01) | |
| C02F 1/28 | (2006.01) | |
| C02F 1/32 | (2006.01) | |
| C02F 1/44 | (2006.01) | |
| C02F 1/76 | (2006.01) | |

(52) U.S. Cl.
CPC .............. *B01J 39/05* (2017.01); *C02F 1/008* (2013.01); *C02F 1/469* (2013.01); *C02F 1/66* (2013.01); *B01D 2311/08* (2013.01); *B01D 2311/25* (2013.01); *C02F 1/02* (2013.01); *C02F 1/283* (2013.01); *C02F 1/32* (2013.01); *C02F 1/42* (2013.01); *C02F 1/441* (2013.01); *C02F 1/444* (2013.01); *C02F 1/4691* (2013.01); *C02F 1/4693* (2013.01); *C02F 1/76* (2013.01); *C02F 2001/425* (2013.01); *C02F 2201/005* (2013.01); *C02F 2201/46* (2013.01); *C02F 2201/4613* (2013.01); *C02F 2201/4614* (2013.01); *C02F 2201/4615* (2013.01); *C02F 2201/4618* (2013.01); *C02F 2201/46135* (2013.01); *C02F 2201/46145* (2013.01); *C02F 2201/46185* (2013.01); *C02F 2209/001* (2013.01); *C02F 2209/006* (2013.01); *C02F 2209/008* (2013.01); *C02F 2209/02* (2013.01); *C02F 2209/03* (2013.01); *C02F 2209/05* (2013.01); *C02F 2209/06* (2013.01); *C02F 2209/40* (2013.01); *C02F 2301/043* (2013.01); *C02F 2301/046* (2013.01); *C02F 2303/00* (2013.01); *C02F 2303/04* (2013.01); *C02F 2303/22* (2013.01); *Y02W 10/37* (2015.05)

(56) References Cited

U.S. PATENT DOCUMENTS

| | | | |
|---|---|---|---|
| 6,296,751 | B1 | 10/2001 | Mir |
| 6,929,748 | B2 | 8/2005 | Avijit et al. |
| 7,862,700 | B2 | 1/2011 | Wilkins et al. |
| 2002/0189951 | A1* | 12/2002 | Liang .................... B01D 61/48 204/523 |
| 2005/0103622 | A1* | 5/2005 | Jha .......................... C02F 1/469 204/237 |
| 2009/0236235 | A1* | 9/2009 | Wilkins .................. C02F 1/469 205/743 |
| 2011/0120886 | A1* | 5/2011 | Jha et al. ..................... 205/743 |
| 2011/0278225 | A1 | 11/2011 | Boodoo |

FOREIGN PATENT DOCUMENTS

| | | |
|---|---|---|
| JP | 2001170630 A | 6/2001 |
| JP | 2001314868 A | 11/2001 |

OTHER PUBLICATIONS

International Search Report and Written Opinion for International Application No. PCT/US2013/022479, dated Mar. 29, 2013.

* cited by examiner

PERFORMANCE ENHANCEMENT OF ELECTROCHEMICAL DEIONIZATION DEVICES BY PRE-TREATMENT WITH CATION EXCHANGE RESINS

CROSS-REFERENCE TO RELATED APPLICATION

This application is a national stage entry under 35 U.S.C. §371 of PCT application PCT/US2013/022479, filed Jan. 22, 2013, which claims the benefit of priority to U.S. Provisional Application No. 61/592,293 filed Jan. 30, 2012.

FIELD OF THE INVENTION

The invention generally relates to a method and apparatus for treating water by using a cation exchange resin to lower the pH of one or more liquid streams in a treatment system comprising an electrochemical water treatment device.

SUMMARY

In one aspect, the methods and systems disclosed here provide a water treatment system comprising an electrochemical water treatment device, a recirculating concentrate stream in fluid communication with a first inlet and a first outlet of the electrochemical water treatment device, a flow control device in fluid communication with a first flow path comprising acidic water and configured to be in fluid communication with the recirculating concentrate stream, and a second flow path comprising feed water and configured to be in fluid communication with the recirculating concentrate stream, and a control system in communication with the flow control device.

In another aspect, the treatment system further comprises a recirculating dilution stream in fluid communication with a second inlet and a second outlet of the electrochemical water treatment device. In one aspect, the treatment system further comprises at least one conductivity sensor in communication with the recirculating dilution stream. In addition, the control system is configured to regulate power to the flow control device based at least in part on the measured conductivity of the recirculating dilution stream. In certain aspects, the first flow path is in fluid communication with the recirculating concentrate stream.

In certain aspects, the treatment system further comprises a cation exchange resin device in fluid communication with the first flow path. In another aspect, the treatment system further comprises a waste stream in fluid communication with the recirculating concentrate stream.

In another aspect, the methods and systems disclosed here provide a method of treating water comprising recirculating a concentrate stream through a first inlet and a first outlet of an electrochemical water treatment device, recirculating a dilution stream through a second inlet and a second outlet of the electrochemical water treatment device, measuring at least one property of the recirculating dilution stream, and controlling a first flow path comprising acidic water to the recirculating concentrate stream based at least in part on the at least one measured property of the recirculating dilution stream. In another aspect, the method of treating water further comprises controlling a second flow path comprising feed water to the recirculating concentrate stream based at least in part on the at least one measured property of the recirculating dilution stream.

In another aspect, the method of treating water further comprises measuring at least one property of a feed stream. In certain aspect, the method further comprises controlling the first flow path based at least in part on the measured property of the feed stream.

In another aspect, the method of treating water further comprises discharging a portion of the recirculating concentrate stream to a waste stream.

In another aspect, the method of treating water further comprises producing a product stream from a first outlet of a storage system in fluid communication with the second inlet and the second outlet of the electrochemical water treatment device. In another aspect, the method further comprises controlling flow to the electrochemical water treatment device based at least in part on at least one measured property of fluid in communication with a first inlet to the storage system. In another aspect, the method further comprises measuring at least one property of the product stream. In another aspect, the method further comprises controlling flow to the product stream based at least in part on the at least one measured property of the product stream.

In one aspect, the methods and systems disclosed here provide a method for providing treated water comprising passing a recirculating dilution stream through an inlet and an outlet of at least one depleting compartment in an electrochemical water treatment device, measuring at least one property of the recirculating dilution stream, calculating an LSI of the recirculating dilution stream based on the at least one measured property, determining the difference between the measured LSI to a target LSI, and controlling a flow path in a flow control device based at least in part on the difference between the measured LSI to a target LSI. In one aspect, the method further comprises passing a recirculating concentrate stream through an inlet and an outlet of at least one concentrating compartment in the electrochemical water treatment device. In another aspect, the method further comprises providing an acidic water stream in fluid communication with the recirculating concentrate stream and controlling a flow path comprising the acidic water stream to the recirculating concentrate stream based at least in part on the difference between the measured LSI to the target LSI.

These and other objects, along with advantages and features of the systems and methods described herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

Non-limiting embodiments of the systems and methods described herein will be described by way of example, and optionally, with reference to the accompanying drawings. In the following description, various embodiments of the systems and methods described herein are described with reference to the following drawings, in which.

DETAILED DESCRIPTION

Figure 1:
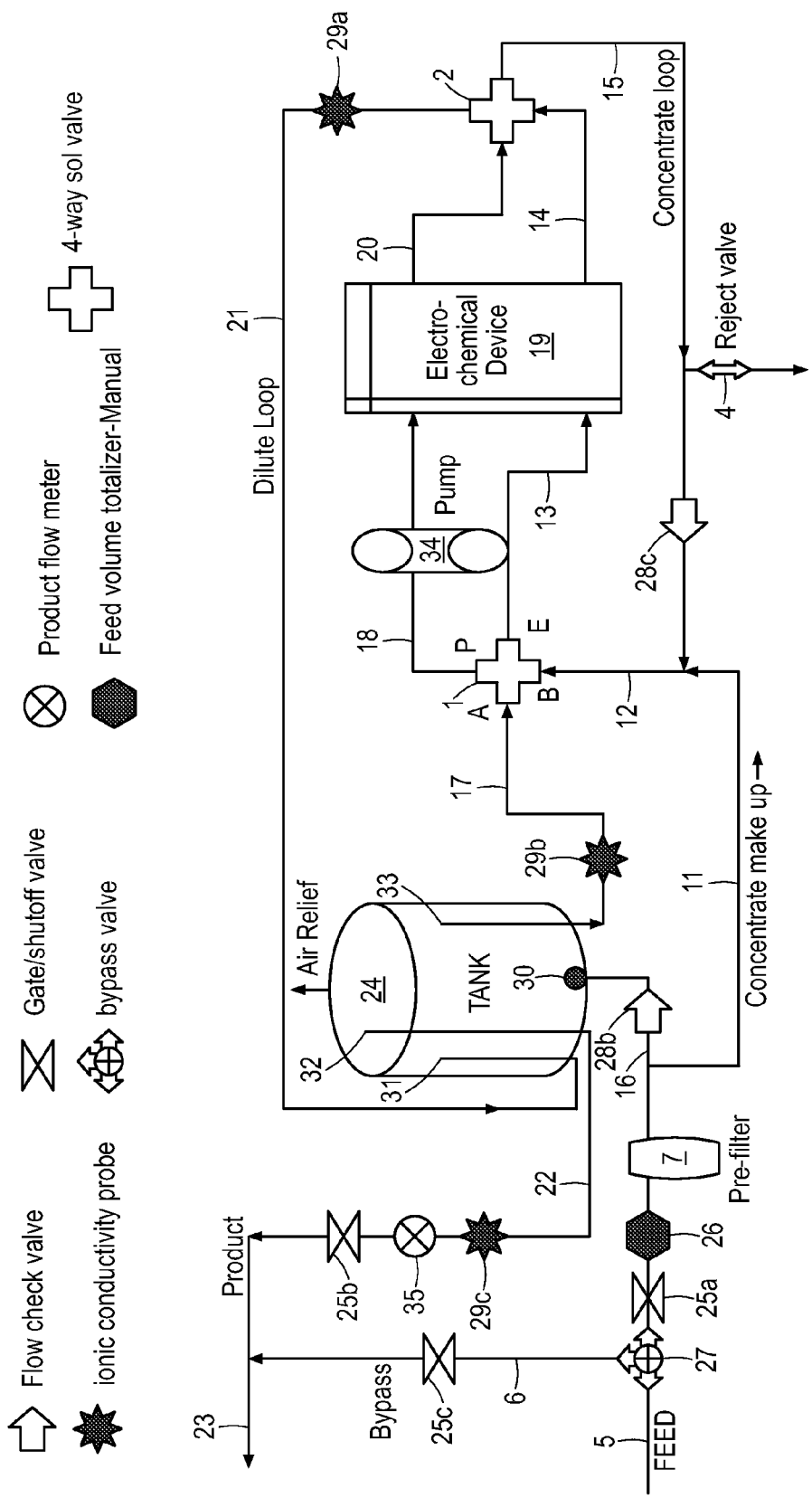
FIG. 1 is a process flow diagram of a conventional treatment system without a cation exchange media device.

Water that contains hardness species such as calcium and magnesium may be undesirable for some uses, for example, in industrial, commercial, residential, or household applications. Hard water requires more soap and synthetic detergents for home laundry and washing, and contributes to scaling in pipes, boilers and industrial equipment. Hardness is caused by compounds of calcium and magnesium, as well as a variety of other metals, and is primarily a function of the geology of the area where the ground water is located. Water acts as an excellent solvent and readily dissolves minerals it comes in contact with. As water moves through soil and rock, it dissolves very small amounts of minerals and holds them in solution. Calcium and magnesium dissolved in water are the two most common minerals that make water "hard," although iron, strontium, and manganese may also contribute. The hardness of water is referred to by three types of measurements: grains per gallon (gpg), milligrams per liter (mg/L), or parts per million (ppm). Hardness is usually reported as an equivalent quantity of calcium carbonate ($CaCO_3$). One grain of hardness equals 17.1 mg/L or 17.1 ppm of hardness. The typical guidelines for a classification of water hardness are: zero to 60 mg/L of calcium carbonate is classified as soft; 61 mg/L to 120 mg/L as moderately hard; 121 mg/L to 180 mg/L as hard; and more than 180 mg/L as very hard.

Alkalinity and hardness are both important components of water quality. Alkalinity is a measure of the amount of acid (hydrogen ion) water can absorb (buffer) before achieving a designated pH. Total alkalinity indicates the quantity of base present in water, for example, bicarbonates, carbonates, phosphates, and hydroxides. Hardness represents the overall concentration of divalent salts for example, calcium, magnesium, and iron, but does not identify which of these elements is/are the source of hardness.

Ion exchange is the reversible interchange of ions between a solid (for example, an ion exchange resin) and a liquid (for example, water). Since ion exchange resins act as "chemical sponges," they are ideally suited for effective removal of contaminants from water and other liquids. Ion exchange technology is often used in water demineralization and softening, wastewater recycling, and other water treatment processes. Ion exchange resins are also used in a variety of specialized applications, for example, chemical processing, pharmaceuticals, mining, and food and beverage processing.

Hard water contains greater than about 60 ppm of calcium carbonate and is often treated prior to use by being passed through a water softener. Typically, the water softener is of the rechargeable ion exchange type and is charged with cation resin in the sodium form and anion resin in the chloride form. As water passes through the resin bed, major contributors to hardness, such as calcium and magnesium species, are exchanged for sodium. In this manner, the water can be softened by a water softening system as the concentration of divalent cations and, in particular, calcium and magnesium ions decrease.

In water softening systems, the hardness ions become ionically bound to oppositely charged ionic species that are mixed on the surface of the ion exchange resin. The ion exchange resin eventually becomes saturated with ionically bound hardness ion species and must be regenerated. Regeneration involves replacing the bound hardness species with more soluble ionic species, such as sodium chloride. The hardness species bound on the ion exchange resin are replaced by the sodium ions and the ion exchange resins are ready again for a subsequent water-softening step. However, an equivalent of sodium is added to the treated water for every equivalent of calcium that is removed. Thus, although the water is softened, the hardness is replaced with sodium ions that some consumers may find undesirable. Furthermore, when these ion exchange beds are recharged, the resulting brine must be disposed of and is often discharged to a septic system where the brine becomes available to re-enter the ground water. More recently, in certain regions, discharge of brine to a domestic septic system or to the environment is regulated or prohibited.

Other methods of softening water include the use of reverse osmosis devices that can supply high purity water, but generally do so at a slow rate and require the use of a high pressure pump. Furthermore, many reverse osmosis membranes can be fouled by the presence of dissolved materials such as silica, which may often be found in well water.

Quality drinking water is often associated with highly purified water. However, as long as the water is free of microbial contamination, the best drinking water may not necessarily be the most chemically pure. For example, water that has been purified to a high resistivity, for example, greater than about 1 megaOhm, may be so devoid of ionic content that it becomes "hungry" and corrosive to material, such as copper, that may be used in water piping systems. Taste may also be affected by, for instance, the removal of bicarbonate species. Furthermore, beneficial or desirable chemicals that have been added to the water, for example, fluoride and chlorine species, may be removed along with undesirable species, resulting in water that may need to be re-fortified. In some regions, minimum levels of calcium may be necessary in order to comply with health and safety regulations and a high purity system that removes greater than, for example, 90% or 99% of the calcium from the water supply may be inappropriate.

The performance of electrochemical water treatment devices, especially in hard water applications, is limited by precipitation formed from hard ions such as calcium and magnesium. When water exceeds the solubility limit, hard ions, such as calcium and magnesium, drop out as crystals. One of the methods for determining the solubility limit is the Langelier Saturation Index (LSI). The Langelier Saturation Index (sometimes called the Langelier Stability Index) is a calculated number used to predict the calcium carbonate stability of water. LSI may be calculated according to a standard method, for example, ASTM D 3739. The resulting value indicates whether the water will precipitate, dissolve, or be in equilibrium with calcium carbonate.

The Langelier saturation level approaches the concept of saturation using pH as a main variable. The LSI is expressed as the difference between the actual system pH and the saturation pH. LSI can be interpreted as the pH change required to bring water to equilibrium. Water with an LSI of 1.0 is one pH unit above saturation. Reducing the pH by 1 unit will bring the water into equilibrium. This occurs because the portion of total alkalinity present as $CO_3^{-2}$ decreases as the pH decreases. For LSI>0, water is super saturated and tends to precipitate a scale layer of $CaCO_3$. For LSI=0 or close to 0, water is saturated (in equilibrium) with $CaCO_3$. A scale layer of $CaCO_3$ is neither precipitated nor dissolved. Water quality, changes in temperature, or evaporation could change the index. For LSI<0, water is under saturated and tends to dissolve solid $CaCO_3$.

If the actual pH of the water is below the saturation pH, the LSI is negative and the water has a very limited scaling potential. If the actual pH exceeds the saturation pH, then LSI is positive, and being supersaturated with $CaCO_3$, the water has a tendency to form scale. At increasing positive index values, the scaling potential increases.

LSI values are also dependent on temperature, with LSI becoming more positive as the water temperature increases. This has particular implications in situations where well water is used. The temperature of the water when it first exits the well is often significantly lower than the temperature inside the building served by the well, or inside the laboratory or process unit where the LSI measurement is made. The resulting increase in temperature can cause scaling, especially in hot water heaters. Conversely, systems that reduce water temperature will have less scaling.

Electrochemical deionization units include electrodialysis (ED), electrodialysis reversal (EDR), electrodeionization (EDI), capacitive deionization, continuous electrodeionization (CEDI), and reversible continuous electrodeionization (RCEDI).

Electrodeionization (EDI) is one process that may be used to demineralize, purify, or treat water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having a permanent or temporary charge, and can be operated to cause electrochemical reactions designed to achieve or enhance performance. These devices may also include electrically active membranes such as semi-permeable ion exchange or bipolar membranes.

Continuous electrodeionization (CEDI) is a process where the primary sizing parameter is the transport through the media, instead of the ionic capacity of the media. A CEDI device includes one or more electroactive semi-permeable anion and cation selective membranes. The spaces between the membranes are configured to create liquid flow compartments with inlets and outlets. A transverse DC electrical field is imposed by an external power source using electrodes at the bounds of the membranes and compartments.

A capacitive deionization (CapDI) device is used to remove an ionic material from a medium, for example, hard water, by applying a voltage to a pair of electrodes having nanometer-sized pores to polarize the pair of electrodes. This allows ionic material to be adsorbed onto a surface of at least one of the pair of electrodes. In the CapDI device, a low DC voltage is applied to the pair of electrodes and the medium containing dissolved ions then flows between the two electrodes, anions dissolved in the medium are adsorbed and concentrated in the positive electrode, and cations dissolved in the medium are adsorbed and concentrated in the negative electrode. When a current is supplied in a reverse direction, for example, by electrically shorting the two electrodes, the concentrated ions are desorbed from the negative electrode and the positive electrode. Since the CapDI device does not use a high potential difference, the energy efficiency is high. The CapDI device may remove detrimental ions as well as hardness components, when ions are adsorbed onto the electrodes. The CapDI device does not use a chemical to regenerate the electrodes, and therefore the CapDI device has a relatively low environmental impact.

One of the potential problems in electrochemical water treatment processes is the risk of forming insoluble calcium or magnesium deposits. These deposits are formed at conditions of high $Ca^{2+}$ and/or $Mg^{2+}$ concentration and at high pH values. Thus, LSI increases in the concentrating compartments of electrochemical water treatment devices due to the increase in hard ion concentration, or where the water is removed without reduction of hard ion concentration. Most electrochemical water treatment devices are designed to maintain the LSI at values of about 0 to 2. In order to maintain these values, more water is required in the concentrating compartment, resulting in higher volumes of waste water. This contributes to inefficiencies in operating the electrochemical water treatment device.

Frequently, electrochemical water treatment devices are designed to remove as many ions as possible. For many industrial and commercial uses, this highly purified water may be beneficial; however, this level of purity may be undesirable for other applications, for example, a household water supply, where some level of cation content may be beneficial. Furthermore, highly purified water may be corrosive and may be prone to attack copper pipes that are often present in water distribution systems. Some water distribution systems may include lead soldered joints, and heavy metals, such as lead, may also leach into water passing through the pipes.

As used herein, the term "treated" in reference to water or fluid, references low TDS, low LSI water and/or low conductivity water. In certain embodiments disclosed here, low conductivity water has a TDS of about 180 µS/cm to about 300 µS/cm. As used herein, low LSI water has an LSI of less than about 2, preferably, less than about 1, and more preferably, less than or about zero.

As used herein, the phrases "treatment device" or "purification device" or "apparatus" pertain to any device that can be used to remove or reduce the concentration level of any undesirable species from a fluid to be treated. Examples of suitable treatment apparatuses include, but are not limited to, ion-exchange resin devices, reverse osmosis, electrodeionization, electrodialysis, ultrafiltration, microfiltration, and capacitive deionization devices.

As used herein, the phrase "electrochemical water treatment device" refers to any number of electrochemical water treatment devices, non-limiting examples including, but not limited to, electrodeionization devices, electrodialysis devices, capacitive deionization devices, and any combination thereof, and may include devices that may be used in accordance with the principles of the systems and methods described herein as long as they are not inconsistent or contrary to the operation of devices and/or the techniques of the systems and methods described herein.

As used herein, "hardness" refers to a condition that results from the presence of polyvalent cations, for example calcium, magnesium, or other metals, in water, that adversely affect the cleansing capability of the water and the "feel" of the water, and may increase scaling potential. Hardness is usually quantified by measuring the concentration of calcium and magnesium species. In certain embodiments, undesirable species can include hardness ion species.

As used herein, the term "system yield" also refers to treatment system recovery, meaning the measure of waste versus production. System yield/recovery rates are determined using the following calculation:

System yield=[Product volume/(Waste volume+Product volume)]*100

As used herein, the term "monitoring" in relation to the methods and systems disclosed here, refers to any activity including detecting, measuring, calculating, and any other action that embraces test information or data or any other measures for obtaining information concerning an operation or process.

Electrical conductivity (EC) is a measure of water's ability to "carry" an electrical current, and, indirectly, a measure of dissolved solids or ions in the water. Deionized water has a very low conductivity value (nearly zero); hence, the more dissolved solids and ions occurring in the water, the more electrical current the water is able to conduct. A conductivity probe in conjunction with a temperature sensor is capable of determining the electrical resistance of a liquid. Fresh water usually reflects electrical conductivity in units of micro Siemens ($\mu$S/cm).

Total Dissolved Solids (TDS) are the total amount of mobile charged ions, including minerals, salts, or metals dissolved in a given volume of water, expressed in units of mg per unit volume of water (mg/L), also referred to as parts per million (ppm). TDS is directly related to the purity and quality of water and water purification systems and affects everything that consumes, lives in, or uses water, whether organic or inorganic. The term "dissolved solids" refers to any minerals, salts, metals, cations or anions dissolved in water, and includes anything present in water other than the pure water ($H_2O$) molecule and suspended solids. In general, the total dissolved solids concentration is the sum of the cations and anions in the water. Parts per million (ppm) is the weight-to-weight ratio of any ion to water. TDS is based on the electrical conductivity (EC) of water, with pure water having virtually no conductivity.

The systems and methods described herein are directed to water treatment or purification systems and methods of providing treated water in industrial, commercial, residential, and household settings. One or more embodiments will be described using water as the fluid but should not be limited as such. For example, where reference is made to treating water, it is believed that other fluids can be treated according to the systems and methods described herein. Moreover, the treatment systems and apparatuses described herein are believed to be applicable in instances where reference is made to a component of the system or to a method that adjusts, modifies, measures or operates on the water or a property of the water. The fluid to be treated may also be a fluid that is a mixture comprising water.

In one aspect, the systems and methods described herein provide purified or treated water from a variety of source types. Possible water sources include well water, surface water, municipal water and rain water. The treated product may be for general use or for human consumption or other domestic uses, for example, bathing, laundering, and dishwashing.

In another aspect, the systems and methods described herein can be operated to reduce the likelihood of formation of any scale or foulants that are generated while producing treated water. The formation of scale or foulants in the treatment system, including its components, such as pumps, valves, and fluid lines, may be inhibited by substituting the flowing liquid from one having a high tendency to form scale to a liquid having a low to small tendency to produce scale, such as water having a low LSI.

The treatment system in accordance with one or more embodiments of the systems and methods described herein receives water from a source and subsequently passes it through a treatment process to produce a product stream possessing targeted characteristics. The treatment system may have a water storage system in line with at least one or more treatment devices, non-limiting examples including: electrochemical water treatment devices, reverse osmosis devices, electrodialysis devices, ion exchange resin devices, capacitive deionization devices, microfiltration devices, and/or ultrafiltration devices.

In accordance with one or more embodiments, the systems and methods described herein provide for the addition of hydrogen ions ($H^+$) to water, which contributes to reducing the corrosivity of the treated water. The addition of hydrogen to the water may manifest itself by a detectable increase in dissolved hydrogen or a resulting decrease in the concentration of oxidative species. This may also provide desirable anti-oxidant properties as well. Advantages to the disclosed methods and systems include, for example, lower volumes of waste water ejected from the system, increased protection of process components, for example, valves, pipes, sensors, and treatment devices from scale formation. Further advantages include the ability to de-scale certain process components and to lower one or more maintenance costs associated with the treatment system.

In one aspect, the systems and methods described herein provide for controlling the LSI of at least one concentration loop that recirculates through an electrochemical water treatment device by allowing water that has passed through a cation exchange resin device to fluidly communicate with the concentrate loop make-up water.

In certain aspects, the recirculating concentration loop has a target LSI of less than about 2, preferably, less than about 1, and more preferably, less than or about zero. In certain aspect, the recirculating concentration loop has a target LSI of about 2.

In another aspect, the methods and systems of the systems and methods described herein provide treated water while decreasing the ionic load discharged from the treatment system. Furthermore, the total amount of waste water discharged as a result of the treatment process may be significantly less than conventional treatment processes, for example, waste water discharged may be less than 25%, less than 20%, or less than 10% of the total volume of water treated.

In another aspect, the systems and methods described herein provide for controlling the source of make-up water to a recirculating concentrate stream based at least in part on the conductivity of water stored in one or more storage systems. In one aspect, if the conductivity of the water stored in the storage system is greater than about 400 $\mu$S/cm, then the conductivity of the recirculating concentrate stream is lowered by the addition of at least a portion of an acidic water stream that has passed through a cation exchange resin device. In another aspect, if the conductivity of the storage system is less than about 400 $\mu$S/cm, then the acidic water stream is bypassed and feed water is used as make-up water to the recirculating concentrate stream. In certain aspects, controlling the source of make-up water to the recirculating concentrate stream is based at least in part on the hardness of water stored in one or more storage systems. In other aspects, controlling the source of make-up water to the recirculating concentrate stream is based at least in part on the alkalinity of feed water in fluid communication with the water treatment system. In certain embodiments, when the hardness of water stored in at least one or more storage systems is within a range of about 8 to about 10 gpg, and the alkalinity of feed water in fluid communication with the water treatment system is lower than about 200 ppm (or not significantly higher than 200 ppm), then the acidic water stream is bypassed and feed water is used as make-up water to the recirculating concentrate stream.

In certain aspects, water characterized as having an LSI value of 1.14 possesses the following characteristics: pH 7.4, calcium hardness 860 ppm, alkalinity 860 ppm, temperature 20° C. In another aspect, water characterized as having an LSI value of 1.41 possesses the following characteristics: pH 8.0, calcium hardness 400 ppm, alkalinity 860 ppm, temperature 20° C.

In one aspect, the systems and methods described herein provide a method of treating water. The method can comprise recirculating at least a portion of a concentrate stream through an electrochemical water treatment device, introducing a portion of water that has passed through a cation exchange device to the recirculating concentrate stream, and discharging a portion of the concentrate stream according to a predetermined discharge schedule.

In another aspect, the systems and methods described herein provide for introducing water into an electrochemical water treatment device to produce a recirculating dilution stream.

In certain non-limiting embodiments, the methods and systems disclosed here comprise an electrochemical water treatment device. Non-limiting examples of electrochemical water treatment device include electrodeionization devices, reverse osmosis devices, ion-exchange resin beds, electrodialysis devices, capacitive deionization devices, bipolar membrane desalting devices, and any combination thereof.

One or more embodiments of the treatment systems disclosed here include one or more fluid control devices, such as pumps, valves, regulators, sensors, pipes, connectors, controllers, power sources, and any combination thereof.

In accordance with one or more embodiments, the treatment systems disclosed here further comprise one or more pumps. A variety of pumps for pumping and/or recirculating fluid may be used in conjunction with the treatment system. Pumps may be internal and/or external to one or more of the components of the treatment system, and/or may be otherwise integrated with the treatment system. Non-limiting examples of pumps include electrical pumps, air driven pumps, and hydraulic pumps. The pump may be driven by a power source that can be any conventional power source, for example, gasoline driven motors, diesel driven motors, solar-powered motors, electric motors, and any combination thereof.

In accordance with one or more embodiments, the methods and systems disclosed here further comprise one or more valves. Non-limiting examples of valves suitable for control according to one or more embodiments include, but are not limited to, check valves, gate valves, bypass valves, solenoid valves, other types of hydraulic valves, other types of pneumatic valves, relief valves, and any combination thereof. Suitable valves include one-way and/or multi-way valves. In certain non-limiting embodiments, the valve can be a pilot valve, a rotary valve, a ball valve, a diaphragm valve, a butterfly valve, a flutter valve, a swing check valve, a clapper valve, a stopper-check valve, a lift-check valve, and any combination thereof. The valves may be manually actuated (for example, by an operator) and/or hydraulically, pneumatically, solenoid, or otherwise actuated, including control actuated by a process controller or control system. The valves may be an on/off type of valve, or may be a proportional type of valve.

The treatment system, in some embodiments of the systems and methods described herein, further comprises one or more sensors or monitoring devices configured to measure at least one property of the water or an operating condition of the treatment system. Non-limiting examples of sensors include composition analyzers, pH sensors, temperature sensors, conductivity sensors, pressure sensors, and flow sensors. In certain embodiments, the sensors provide real-time detection that reads, or otherwise senses, the properties or conditions of interest. A few non-limiting examples of sensors suitable for use in one or more embodiments include optical sensors, magnetic sensors, radio frequency identification (RFID) sensors, Hall effect sensors, and any combination thereof.

In one or more embodiments, an RFID antenna can be used to provide positional and other information regarding the treatment system, such as one or more water properties. The RFID antenna senses the targeted information and an associated RFID antenna control processor can transmit the information to a system processor, thereby providing one method of in-line real-time process control.

In certain non-limiting embodiments of the systems and methods described herein, the treatment system further comprises a flowmeter for sensing the flow of fluid. A non-limiting example of a flowmeter suitable for certain aspects of the treatment system disclosed here includes a Hall effect flowmeter. Other non-limiting examples of flowmeters suitable for certain aspects of the treatment system include mechanical flowmeters, including a mechanical-drive Woltman-type turbine flowmeter.

One or more aspects of the invention include a control system disposed or configured to receive one or more signals from one or more sensors in the treatment system. The control system can be further configured to provide one or more output or control signals to one or more components of the treatment system. One or more control systems can be implemented using one or more computer systems. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include PLCs, specially-programmed, special-purpose hardware, for example, an application-specific integrated circuit (ASIC), or controllers intended for analytical systems.

In some embodiments, the control system can include one or more processors connected to one or more memory devices, which can comprise, for example, any one or more of a disk drive memory, a flash memory device, a RAM memory device, or other device for storing data. The one or more memory devices can be used for storing programs and data during operation of the treatment system and/or a control subsystem. For example, the memory device may be used for storing historical data relating to the parameters over a period of time, as well as current operating data. Software, including programming code that implements embodiments of the invention, can be stored on a computer readable and/or writeable nonvolatile recording medium, and then copied into the one or more memory devices where it can then be executed by the one or more processors. Such programming code may be written in any of a plurality of programming languages, for example, ladder logic, Java, Visual Basic, C, C#, or C++, Fortran, Pascal, Eiffel, Basic, COBOL, or any of a variety of combinations thereof.

Components of a control system may be coupled by one or more interconnection mechanisms, which may include one or more busses, for example, between components that are integrated within a same device, and/or one or more networks, for example, between components that reside on separate discrete devices. The interconnection mechanism enables communication, for example, data, instructions, to be exchanged between components of the system.

The control system can further include one or more input devices, for example, a keyboard, mouse, trackball, microphone, touch screen, and one or more output devices, for example, a printing device, display screen, or speaker. In addition, the control system may contain one or more interfaces that can connect to a communication network, in addition to or as an alternative to the network that may be formed by one or more of the components of the control system.

According to one or more embodiments, one or more input devices may include one or more sensors for measuring the one or more parameters of the fluids in the treatment system. Alternatively, the sensors, the metering valves and/or pumps, and/or all of these components, may be connected to a communication network that is operatively coupled to a control system. For example, sensors may be configured as input devices that are directly connected to the control system. Additionally, metering valves and/or pumps of the one or more sources of treating compositions may be configured as output devices that are connected to the control system, and any one or more of the above may be coupled to another ancillary computer system or component so as to communicate with the control system over a communication network. Such a configuration permits one sensor to be located at a significant distance from another sensor or allows any sensor to be located at a significant distance from any subsystem and/or the controller, while still providing data therebetween.

In certain embodiments, a computer can be coupled to a server and to a plurality of different input devices. The input devices may include, for example, a wireless communication device (for example, a radio frequency identification (RFID) antenna), one or more sensors, a touch screen having a virtual keyboard, and one or more monitoring devices. For purposes of this disclosure, the term "monitoring" may be defined to include, in a non-limiting manner, acts such as recording, observing, evaluating, identifying, etc. In addition, the RFID antenna, any of the sensors, and/or the touch screen, may be configured to operate both as input devices and/or output devices. The touch screen is optional and may alternatively include other known input devices such as a keyboard, mouse, touch pad, joystick, remote control (either wireless or with a wire), track ball, mobile device, etc.

In certain non-limiting embodiments, a computer is wirelessly coupled to a server and an RFID antenna and one or more other sensors. The RFID antenna may receive input from an RFID device, such as a tag device, secured or otherwise in communication to one or more components of the treatment system. The RFID device can be programmed to include a wide range of information, and additional monitoring information collected during one or more water treatment cycles can be added to the RFID device. When the RFID device is in communication with the RFID antenna, any information programmed into the RFID device can be downloaded onto the computer and transferred to the server. The RFID device may also include an encryption device.

The control system can include one or more types of computer storage media such as readable and/or writeable nonvolatile recording medium in which signals can be stored that define a program to be executed by one or more processors. The storage or recording medium may be, for example, a disk or flash memory. In operation, the processor can cause data, such as code that implements one or more embodiments of the invention, to be read from the storage medium into a memory device that allows for faster access to the information by the one or more processors. The memory device is a volatile, random access memory such as a dynamic random access memory (DRAM), or static memory (SRAM), or any other suitable devices that facilitate information transfer both to and from the one or more processors.

In certain embodiments, the treatment system also includes a controller for adjusting, monitoring, or regulating at least one operating parameter and its components of the treatment system. A controller comprises a microprocessor-based device, such as a programmable logic controller (PLC) or a distributed control system that receives or sends input and output signals to one or more components of a treatment system. In certain embodiments, the controller regulates the operating conditions of the treatment system in an open-loop or closed-loop control scheme. For example, the controller, in open-loop control, can provide signals to the treatment system such that water is treated without measuring any operating conditions. The controller can also control the operating conditions in closed-loop control so that any one or more operating parameters can be adjusted based on an operating condition measured by, for example, a sensor. In yet another embodiment, the controller can further comprise a communication system, for example, a remote communication device, for transmitting or sending the measured operating condition or operating parameter to a remote station.

The controller, or components or subsections thereof, may alternatively be implemented as a dedicated system or as a dedicated programmable logic controller (PLC) in a distributed control system. Further, it should be appreciated that one or more features or aspects of the invention may be implemented in software, hardware or firmware, and any combination thereof. For example, one or more segments of an algorithm executable by the one or more controllers can be performed in separate computers, which in turn, can be communicated through one or more networks.

One or more embodiments of the systems and methods described herein will be described with reference to FIGS. 1-5. In the figures, darkened, bold lines highlight certain representative pathways through which liquid can flow according to the described liquid circuit or stream.

FIG. 1 is a process flow diagram of a treatment system without a cation exchange media device. The treatment system includes a recirculating concentrate stream that fluidly connects at least one outlet of electrochemical water treatment device 19. For example, the recirculating concentrate stream may connect to a manifold outlet (not shown), which collects liquid exiting compartments, for example, depleting or concentrating compartments of the electrochemical water treatment device 19. The recirculating concentrate stream can also be connected to an inlet and an outlet of electrochemical water treatment device 19 through, as illustrated in FIG. 1, pump 34 and valves 1 and 2.

Figure 2:
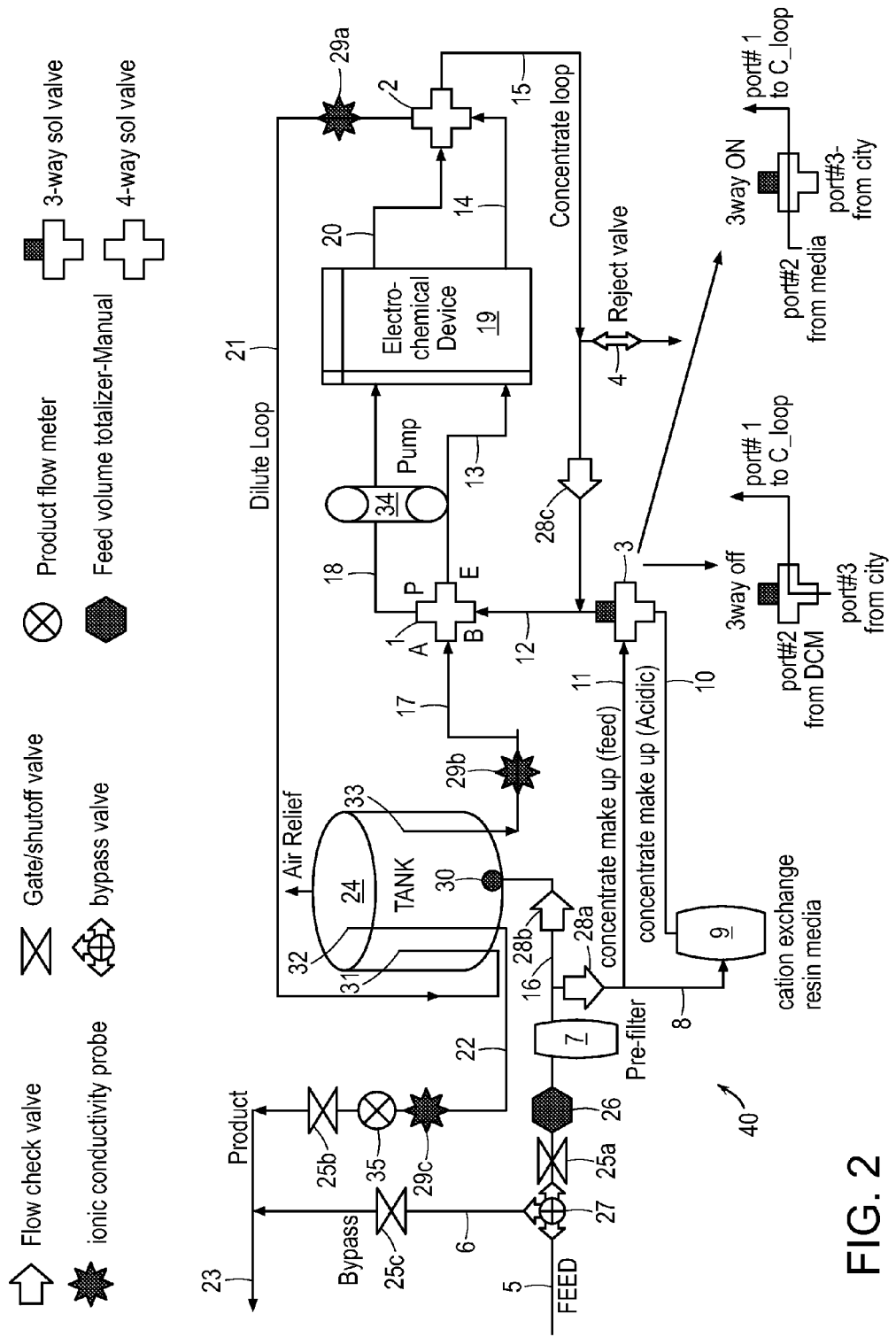
FIG. 2 is a process flow diagram of a treatment system in accordance with one or more embodiments of the systems and methods described herein.

FIG. 2 is a process flow diagram of a treatment system according to one or more embodiments of the systems and methods described herein comprising one or more liquid circuits. A liquid circuit is illustrated in which feed stream 5 is introduced to the treatment system 40. In certain non-limiting embodiments, the feed stream 5 provides or fluidly communicates water from a water source to treatment system 40. Non-limiting examples of the water source include potable water sources, for example, municipal water, well water, non-potable water sources, for example, brackish or salt-water, pre-treated semi-pure water, and any combination thereof. In some instances, a treatment system, for example, a purification system, and/or a chlorine removal system, treats the water before it comprises the feed stream. The feed stream may contain dissolved salts or ionic or ionizable species including sodium, chloride, chlorine, calcium ions, magnesium ions, carbonates, sulfates or other insoluble or semi-soluble species or dissolved gases, such as silica and carbon dioxide. The feed stream may also contain additives, such as fluoride, chlorate, and bromate species.

In accordance with one or more embodiments, treatment system 40 includes a fluid distribution system. The distribution system comprises components that are fluidly connected to provide fluid communication between components of the treatment system, for example, providing fluid communication between treated water, from storage system 24, to product stream 23. The distribution system can comprise any arrangement of pipes, valves, tees, pumps, manifolds, and any combination thereof, to provide fluid communication throughout treatment system 40 and throughout one or more product streams or storage systems available to a user. In certain embodiments, the distribution system further comprises a household or residential water distribution system including, but not limited to, connections to one or more points of use such as, a sink faucet, a showerhead, a washing machine, and a dishwasher. For example, treatment system 40 may be connected to the cold, hot, or both, water distribution systems of a household. Pumps and vacuum sources may be in fluid communication with various components of the fluid distribution system for purposes of controlling liquid flow by pressurizing the liquid. The pressurized liquid stream may further comprise a regulator where the pressure can be more readily controlled. Fluid may also be caused to flow by gravity.

The liquid circuit can further comprise a bypass valve 27, to allow liquid to flow through a conduit 6 and a valve 25*c* to connect to product stream 23, or, conversely, to allow liquid to flow through valve 25*a*, flowmeter 26, and pre-filter 7. Bypass valve 27 operates to pass fluid from feed stream 5 to either conduit 6 (and thus bypass the treatment system), or to cause the feed stream to pass to one or more components of the treatment system.

Pre-filter device 7 may be a preliminary filter or pre-treatment device designed to remove a portion of any undesirable species from the water before the water is further introduced into one or more components of treatment system 40. Non-limiting examples of pre-filter devices include, for example, carbon or charcoal filters that may be used to remove at least a portion of any chlorine, including active chlorine, or any species that may foul or interfere with the operation of any of the components of the treatment system process flow. Additional examples of pre-treatment devices include, but are not limited to, ionic exchange devices, mechanical filters, and reverse osmosis devices. Pre-treatment systems can be positioned anywhere within treatment system 40. For example, water that enters storage system 24 after being treated by electrochemical water treatment device 19 may contain little or no chlorine (or any other alternative disinfectant). To retain a residual chlorine level in storage system 24, the water can be mixed with untreated water from feed stream 5. Preferably, the chlorinated water is added at a rate adequate to result in mixed water that contains enough chlorine to inhibit bacteriologic activity. Active chlorine refers to chlorine containing species that exhibit anti-microbial activity. An effective chlorine concentration is defined herein as a concentration of active chlorine compounds, for example, sodium hypochlorite, that inhibits the growth of bacteria, such as e-coli, in storage system 24. Therefore, the ratio at which the feed water and treated water are mixed in storage system 24 may be dependent upon a number of factors, including the efficiency of electrochemical water treatment device 19, the desired effective chlorine concentration, the rate at which water contained in storage system 24 is depleted, the temperature of storage system 24, and the source and quality of the feed water. Pre-treatment devices may also be, for example, a particulate filter, aeration device, or a chlorine-reducing filter, and may comprise several devices, or a number of devices arranged in parallel or in a series. Pre-treatment device 7 can be positioned upstream or downstream of the storage system 24, or positioned upstream of electrochemical water treatment device 19 so that at least some chlorine species are retained in the storage system 24 but are removed before water enters the electrochemical water treatment device 19.

In accordance with certain embodiment of the systems and methods described herein, treatment system 40 may also comprise a probe or sensor, for example, a water property sensor, capable of measuring at least one physical property in treatment system 40. For example, the sensor can be a device that measures water conductivity, pH, temperature, pressure, composition, and/or flow rates. The probe or sensor can be installed or positioned within treatment system 40 to measure a particularly preferred water property. For example, a probe or sensor 29*c*, can be a water conductivity sensor installed in or otherwise placed in fluid communication with storage system 24 so that it measures the conductivity of the water. This can provide an indication of the quality of water available for product stream 23. In another embodiment, the probe or sensor can comprise a series or a set of sensors in various configurations or arrangements in treatment system 40. The set of sensors can be constructed, arranged, and connected to a controller so that the controller can monitor, intermittently or continuously, the quality of water in, for example, storage system 24. This arrangement allows the performance of treatment system 40 to be further optimized.

In accordance with other embodiments of the systems and methods described herein, treatment system 40 can comprise a combination of sets of sensors in various locations in the liquid streams or other components throughout treatment system 40. For example, the probe or sensor can be a flow sensor measuring a flow rate from feed stream 5, and can further include any one or more of a pH meter, a nephelometer, a composition analyzer, a temperature sensor, and a pressure sensor monitoring the operating conditions of treatment system 40.

The liquid circuit can further comprise connections to storage system 24 through conduit 16, valve 28*b*, and inlet 30. Storage system 24 can store or accumulate water from feed stream 5 and may also serve to store treated water for product stream 23, from conduit 21, and may further provide water to electrochemical water treatment device 19. In accordance with some embodiments of the systems and methods described herein, storage system 24 comprises a tank, vessel or reservoir that has inlets and outlets for fluid flow, for example inlets 30 and 31, and outlets 32 and 33. In certain non-limiting embodiments, the storage system comprises a tank that has a volume capacity of 15 gallons. In other embodiments, the storage system comprises a tank that has a volume capacity of 24 gallons. In yet other embodiments, the storage system comprises a tank with a volume capacity of 80 gallons. Inlet 30 is in fluid communication to feed stream 5 and outlet 32 is in fluid communication to product stream 23. The fluid path 22 from at least one outlet 32 of the storage system 24 to product stream 23 may further comprise a gate valve 25b, a flowmeter 35, and one or more sensors, for example, ionic conductivity probe 29c.

In certain non-limiting embodiments, when ionic conductivity probe 29c senses a conductivity value above a certain predetermined value, for example, above about 400 μS/cm, then the recirculating concentrate loop make-up water comprises water from acidic liquid stream 10. When ionic conductivity probe 29c senses a conductivity value below a certain predetermined value, for example, below about 400 μS/cm, then the recirculating concentrate loop make-up water comprises water from feed make-up water stream 11.

In certain non-limiting embodiments, storage system 24 can comprise several tanks or vessels, and each tank or vessel, in turn, can have several inlets positioned at various locations. Similarly, outlets 32 and 33 can be positioned on each vessel at various locations depending on, among other things, the demand and flow rate to product stream 23, the capacity or efficiency of electrochemical water treatment device 19, and the capacity or hold-up of storage system 24. Storage system 24 can further comprise various components or elements that perform desirable functions or avoid undesirable consequences. For example, the tanks or vessels may have internal components, such as baffles, that are positioned to disrupt any internal flow currents or areas of stagnation. In some embodiments, storage system 24 further comprises a heat exchanger for heating or cooling the stored fluid. For example, storage system 24 can comprise a vessel constructed with a heating coil, which can have a heating fluid at an elevated temperature relative to the temperature of the fluid in the vessel. The heating fluid can be hot water in a closed-loop flow with a furnace or other heat generating unit so that the heating fluid temperature is raised in the furnace. The heating fluid, in turn, raises the vessel fluid temperature by heat transfer. Other examples of auxiliary or additional components include, but are not limited to, pressure relief valves designed to relieve internal pressure in the storage system. In accordance with further embodiments of the invention, the treatment system can comprise at least two tanks or vessels or two zones in one or more tanks or vessels, each of which can be, at least partially, fluidly isolated from the other. For example, the treatment system can comprise two vessels fluidly connected to a feed stream and to one or more treatment devices. The two tanks or vessels can be fluidly isolated from each other by conduits and valves so that the first can be placed in service with one or more treatment devices while the second can be removed from service for, for example, maintenance or cleaning. In accordance with one or more embodiments of the systems and methods described herein, the tank or reservoir system is connected to, or in thermal communication with, a heat exchanger and, optionally, to a fluid treatment device. The fluid treatment device can be an electrochemical water treatment device, a reverse osmosis device, an ion-exchange resin bed, an electrodialysis device, a capacitive deionization device, or combinations thereof.

In certain embodiments, liquid exiting electrochemical water treatment device 19 may be directed by valve 2 to conduit 21 and storage system 24. In addition, storage system 24 can store or accumulate water from feed stream 5. Thus, storage system 24 may include treated water from conduit 21 as well as untreated, or minimally treated, water provided from feed stream 5. Storage system 24 may be configured so that these two water sources are mixed, or alternatively, the two water sources are segregated, for example, one of the water sources may enter the bottom of storage system 24 and proceed in plug-flow manner upwardly to outlets 32 or 33.

In certain non-limiting embodiments, the liquid circuit comprises one or more electrochemical acidification devices, for example, a cation exchange device 9, comprising a cation exchange resin. In certain non-limiting embodiments, the performance of cation exchange device 9 may be improved by pre-treatment that includes the removal of chlorine. For example, a municipally treated water supply may be supplied to feed stream 5 and passed through pre-filter device 7, which may be, for example, a chlorine reducing filter, such as a carbon filter or another pre-treatment device prior to entry into cation exchange resin device 9.

The pKa value of acidic cation exchange resins is defined as the pH of the water contacting the acidic resin whereby the number of functional groups in the HA form is 10 times more than the number of functional groups in the A-form. Weakly acidic cation exchange resins have a 3<pKa<9 and, for example, have carboxylic acid functional groups. Strongly acidic cation exchange resins have a pKa<3 and, for example, have sulfonic acid functional groups. Non-limiting examples of strongly acidic cation exchange resins include: AMBERJET™ 1000 H, 1200 H, 1500 H, AMBERLITE™ IR120H, DOWEX® MONOSPHERE™ 650C (H), 650HXC (H), 650HXC NG (H), 575C NG (H), 650C UPW (H), 650C NG (H), DOWEX® MARATHON™ 650C (H), C, C-10, DOWEX® HCR-W2, DOWEX® HGR-W2, DOWEX® HGR NG (H), (all products of Dow Chemical Co.), PUROFINE™ PFC100H, PUROFINE C100DLH, C100EH, C100H, (all products of Purolite), and USRESIN™ C-8LB (provided by US Resin Co.).

Ion-exchange resins are generally classified into two types. One is a gel-type resin lacking macro pores and the other is a porous resin comprising macro pores. The gel-type resin and the porous resin, if comprising the same type of exchange groups, are significantly different from each other in their properties. Weakly acidic ion exchange resins may experience large increases in volume over the course of their use, causing various problems in certain applications.

In certain non-limiting embodiments, treatment system 40 comprises a regenerable cation exchange device. The regenerable cation exchange device comprises a cartridge containing a cation exchange resin in the hydrogen form. When the cation exchange material reaches its exhaustion point or is near exhaustion, it may be readily regenerated by a strong or weak acid so as to exchange the alkali or alkaline earth metal previously adsorbed onto the active sites of the cation exchange material for hydrogen ions. Regeneration of the cation exchange column can be in either a co-current flow direction or a counter-current flow direction relative to the normal operating flow direction through the cation exchange column, or alternatively, may be pulsed. Additionally, a backwashing step precedes regeneration so as to remove any particulate matter that may have been in solution during operation. Following regeneration, the cation exchange material is preferably rinsed so as to be substantially free of excess regenerant prior to operating the exchange device in the normal manner.

The systems and methods described herein provide a liquid circuit in treatment system 40 that allows a concentrating stream to flow in a recirculating loop through electrochemical water treatment device 19. The recirculating concentrate stream provides fluid communication between a three-way solenoid valve 3, a four-way solenoid valve 1, one or more concentrating compartments of electrochemical water treatment device 19, and a four-way solenoid valve 2. Fluid communication may further be provided by conduits 15, 12, 13, and 14. In certain embodiments, fluid communication may be provided to the recirculating concentrate stream by conduits 15, 12, 18, and 20. In certain embodiments, the recirculating concentrate stream is in fluid communication with cation exchange resin device 9. In certain embodiments, the acidic water exiting the cation exchange resin device is in fluid communication and comprises a portion of the recirculating concentrate stream, thereby serving as acidic concentrate make-up water stream 10. In other embodiments, feed stream 5 is in fluid communication and comprises a portion of the recirculating concentrate stream, thereby serving as concentrate make-up water 11. In this arrangement, the recirculating concentrate stream bypasses the cation exchange resin device. In certain embodiments, the recirculating concentrate stream is in fluid communication with reject valve 4, where fluid exits the treatment system. In certain embodiments, concentrate exiting electrochemical water treatment device 19 can enter conduits 14 and 15 and be directed to reject valve 4, where a portion of the concentrate may be discharged to waste either constantly or intermittently.

The systems and methods described herein provide a liquid circuit in treatment system 40 that allows a dilution stream to flow in a recirculating loop through electrochemical water treatment device 19. The recirculating dilution stream provides fluid communication between four-way solenoid valve 1, four-way solenoid valve 2, one or more depletion compartments in electrochemical water treatment system 19, and storage system 24. Fluid communication may further be provided by conduits 17, 18, 20, and 21. In certain embodiments, fluid communication may be provided to the recirculating dilution stream by conduits 17, 13, 14, and 21.

In certain embodiments, one or more cation exchange resin devices may lie either upstream or downstream of one or more electrochemical water treatment devices. By passing through the cation exchange resin device, the pH of the water can be lowered and result in water having a lower LSI. The lower LSI, which may be reduced to less than 0 (non-scaling), decreases the scaling potential of the water and thus provides for lower maintenance, higher water recovery, increased longevity and in general, a more reliable treatment system.

In certain non-limiting embodiments, the process and methods disclosed here include a solenoid valve. The solenoid valve may be a one-way or multi-way valve, including three-way and four-way valves. The solenoid valve may be an on/off type of valve, a proportional type of valve, and any combination thereof. Three-way solenoid valve 3 functions as a passage changeover means provided at the downstream side of feed stream 5 and cation exchange resin device 9. A first port of valve 3 is in fluid communication with conduit 12 that comprises liquid exiting from at least one outlet of the electrochemical water treatment device 19. A second port of valve 3 is in fluid communication with the acidic concentrate make-up water 10 exiting the cation exchange resin device. A third port of valve 3 is in fluid communication with concentrate loop make-up water comprising feed 11. Conduit 12 is in fluid communication with four-way solenoid valve 1. A first port of valve 1 feeds conduit 13, comprising liquid that is in fluid communication with at least one inlet of electrochemical water treatment device 19. A second four-way solenoid valve 2 is positioned downstream of one or more outlets of electrochemical water treatment device 19. A first port of valve 2 feeds conduit 15. A second port of valve 2 is fed by conduit 14, comprising liquid in fluid communication with at least one outlet of electrochemical water treatment device 19.

In one or more embodiments, a control system is in communication with the three-way solenoid valve, for example, three-way solenoid valve 3. The three-way solenoid valve is a well-known valve device that can allow either one of two incoming fluids in fluid communication with the valve device be directed to an outlet. When valve 3 is in the "off" position, fluid flow from the cation exchange device 9 is interrupted. When valve 3 is in the "on" position fluid flow from the concentrate loop make-up comprising feed 11 is interrupted. Thus, valve 3 can be utilized to direct fluid flow from either the concentrate loop make-up feed stream 11 or the acidic fluid flow from the cation exchange device 10 to conduit 12. The exact selection of which of the concentrate make-up feed streams 10 or 11 will comprise the concentrate stream can be controlled by one or more components of the control system.

Treatment system 40 can further comprise a liquid circuit that allows fluid communication between conduit 21, one or more outlets of electrochemical water treatment device 19, and storage system 24. A third port of valve 2 is fed by conduit 20, comprising fluid from at least one outlet of electrochemical water treatment device 19. In certain embodiments, the outlet of the electrochemical water treatment device comprises ion-depleted water from one or more depletion compartments of electrochemical water treatment device 19. A fourth port of valve 2 is in fluid communication with conduit 21, and may further comprise a sensor, for example, ionic conductivity probe 29a. Conduit 21 is in fluid communication with at least one inlet 31 to storage system 24. An outlet 33 of storage system 24 feeds conduit 17 that is in fluid communication with a third port of valve 1. Conduit 17 can further comprise one or more sensors, for example, ionic conductivity probe 29b. A fourth port of valve 1 feeds conduit 18, providing fluid communication with at least one inlet of electrochemical water treatment device 19. Conduit 18 may further comprise one or more pumps 34 to aid in directing fluid into the one or more inlets of electrochemical water treatment device 19.

The systems and methods described herein further provide a treatment system where the liquid contents of an electrochemical water treatment device are replaced or supplemented with a liquid having a low LSI, thereby inhibiting scale formation. As used here, low LSI water has a LSI of less than about 2, preferably, less than about 1, and more preferably, about zero.

In some embodiments, the systems and methods described herein provide liquids, such as water, having low conductivity. In certain embodiments disclosed here, low conductivity water has a conductivity of about 180 µS/cm to about 300 µS/cm. In certain embodiments, low conductivity water has a conductivity of about 180 µS/cm. In certain other embodiments, low conductivity water has a conductivity of about 220 µS/cm. In even certain other embodiments, low conductivity water has a conductivity of about 280 µS/cm. In certain other embodiments, low conductivity water has a conductivity of about 300 µS/cm. The low conductivity water may be any conductivity in between about 180 µS/cm and about 300 µS/cm, or any range of conductivities in between these values.

In certain embodiments, when the water conductivity value in the storage system is 300 μS/cm, the acidic make-up stream is bypassed when feed water is available with the following characteristics: Total Hardness 20 gpg, TDS 550 ppm, Conductivity 1050 μS/cm.

The systems and methods described herein further provide a treatment system where a controller can provide a signal that actuates valve 3 so that fluid flow is adjusted based on a variety of operating parameters. These parameters include, but are not limited to, the properties of water from feed stream 5, the properties of water in storage system 24, the properties of water in the recirculating dilution stream, and any combination thereof. Other parameters may include the properties of water exiting storage system 24, the demand of water necessary to provide to product stream 23, the operating efficiency or capacity of electrochemical water treatment device 19, the operating parameters associated with electrochemical water treatment device 19, the operating efficiency or capacity of cation exchange device 9, and any combination thereof. Specific measured parameters may include, but are not limited to, water conductivity, pH, turbidity, composition, temperature, pressure, flow rate, and any combination thereof.

In one embodiment, a controller receives signals from one or more sensors so that the controller is capable of monitoring the operating parameters of treatment system 40. For example, a conductivity sensor can be positioned within storage system 24 so that the conductivity is monitored by the controller. In one or more embodiments, a controller receives signals from one or more sensors so that the controller is capable of monitoring the operating parameters of the recirculating dilution stream, for example, conductivity. In operation, the controller can increase, decrease, or otherwise adjust the voltage, current, or both, supplied from a power source to one or more components of the treatment system. The controller includes algorithms that can modify an operating parameter of treatment system 40 based on one or more measured properties of the liquid flowing in the system. For example, in some embodiments, the controller increases or decreases or otherwise adjusts operating cycles of electrochemical water treatment device 19, for example, cycles of reversing applied electric field and the associated fluid flow.

In one or more embodiments of the systems and methods described herein, the controller may reverse the direction of the applied field from a power source to electrochemical water treatment device 19 according to a predetermined schedule or according to an operating condition, such as the water quality, or any other operating parameter in the treatment system. For example, the controller can be configured to reverse the polarity of the electric field applied to electrochemical water treatment device 19 when a measured parameter reaches a set point. In another embodiment, the systems and methods described herein provide a controller that is capable of increasing, decreasing or otherwise adjusting a cycle time based on, for example, the measured water properties, such as, but not limited to, total dissolved solids, water quality, conductivity, and any combination thereof. The cycle can include the period between reversals of the electric field, along with the associated changes, reversals, or substitution of fluid flows within electrochemical water treatment device 19.

The controller can be configured, or configurable by programming, or may be self-adjusting such that it is capable of maximizing any of the service life, the efficiency, or reducing the operating cost of treatment system 40. For example, the controller can comprise a microprocessor having user-selectable set points or self-adjusting set points that adjust the applied voltage, current, or both, to valve 3, cation exchange resin device 9, the flow rate through the recirculating concentrate loop, and the flow rate to discharge valve 4.

In accordance with another embodiment of the systems and methods described herein, the controller regulates the operation of the treatment system by incorporating adaptive or predictive algorithms, which are capable of monitoring demand and water quality and adjusting the operation of any one or more components of the treatment system 40, including cation exchange resin device 9. For example, the controller may be predictive in anticipating higher demand for treated water during early morning hours in a residential application to supply product stream 23 serving a showerhead.

In accordance with one or more embodiments of the invention, when the polarity of the anode and cathode are switched, the function of the concentrating and depleting compartments are also switched. In certain non-limiting embodiments a polarity reversal system or technique is used, and the previously described streams can be switched so that the depleted-ion stream exiting the electrochemical water treatment device and entering conduit 21 and storage system 24 operates as the concentrating loop and the concentrating loop comprises the depleted-ion stream exiting the electrochemical water treatment device. For example, when the polarity runs in a first mode, the recirculating dilution stream includes fluid flowing from outlet 33 of storage system 24, through conduits 17 and 18 and through depletion compartments of electrochemical water treatment device 19, and then through conduits 20 and 21 back into inlet 31 of storage system 24. The corresponding recirculating concentrate stream includes fluid flowing through conduit 13 and through the concentration compartments of electrochemical water treatment device 19 and then to conduits 15, 12, and 13. When the polarity runs in a second mode, the recirculating dilution stream includes fluid flowing from outlet 33 of storage system 24, through conduits 13 and 14 and through electrochemical water treatment device 19, and then through conduits 20 and 21 back into inlet 31 of storage system 24. The corresponding recirculating concentrate stream includes fluid flowing through conduit 18 and through electrochemical water treatment device 19 and then to conduits 20, 15, and 12. Reverse polarity cycles may be based on a number of factors, including time, feed stream quality, temperature, treated water quality, desired water quality, water use rates, and any combination thereof.

In certain non-limiting embodiments, radio frequency identification (RFID) is utilized to provide real-time detection of certain properties or conditions in treatment system 40. In certain embodiments, a plurality of inline identifying tag readers or optical sensors are configured to track or sense certain properties or conditions of the liquid as it is transported through the treatment system. The RFID may be combined with one or more additional sensors, for example, a flowmeter. For example, an embedded tag may be placed in the cartridge of cation exchange resin device 9 and used in combination with a flowmeter to determine various properties or conditions, for example, the presence of the cation exchange resin, the usable volume remaining in the cartridge, and the number of days remaining before the cartridge is exhausted and needs to be replaced.

In certain non-limiting embodiments, valves 1 and 2 can be actuated to provide liquid to be treated from storage system 24 to electrochemical water treatment device 19 and transfer the treated liquid to storage system 24. In some arrangements, the liquid circuit can comprise connections so that untreated liquid can be mixed with liquid that would exit any of the electrode compartments. In another embodiment, the liquid circuit can further comprise connections to and from storage system 24 so that, for example, treated liquid exiting the depleting compartment of electrochemical water treatment device 19 can be transferred to storage system 24 and mixed with untreated liquid from feed stream 5. The resulting mixture may be delivered to product stream 23, and, optionally, to the electrode compartments of the electrochemical water treatment device 19 in parallel or series flow paths.

In accordance with another embodiment of the systems and methods described herein, a controller, through a sensor or set of sensors, can monitor or measure at least one water property of the water storage system 24 and also measure a flow rate flowing in product stream 23. The controller can adjust an operating parameter of electrochemical water treatment device 19 and/or valve 3 based on the measured properties. In one or more embodiments of the systems and methods described herein, at least one or more sensors measure at least one property of feed stream 5 and/or water in storage system 24.

In certain non-limiting embodiments valves 1 and 2 can be actuated to provide fluid communication from one or more depleting compartments of electrochemical water treatment device 19 to at least one electrode compartment of electrochemical water treatment device 19.

In certain embodiments, storage system 24 is connected downstream of feed stream 5 and fluidly communicated, such as in a circulation loop, with electrochemical water treatment device 19. For example, water from feed stream 5 can flow into inlet 30 and mix with the bulk water contained within storage system 24. Bulk water can exit storage system 24 through outlet 32 and be directed to product stream 23 or exit through outlet 33 and be directed through valve 1 into electrochemical water treatment device 19 for treatment or removal of any undesirable species. In certain embodiments, treated water leaving electrochemical water treatment device 19 can mix with water from feed stream 5 by entering storage system 24 through inlet 31. In this way, a loop can be formed between storage system 24 and electrodeionization device 19 and feed stream 5, functioning as one method of replenishing the water leaving via product stream 23.

Figure 2A:
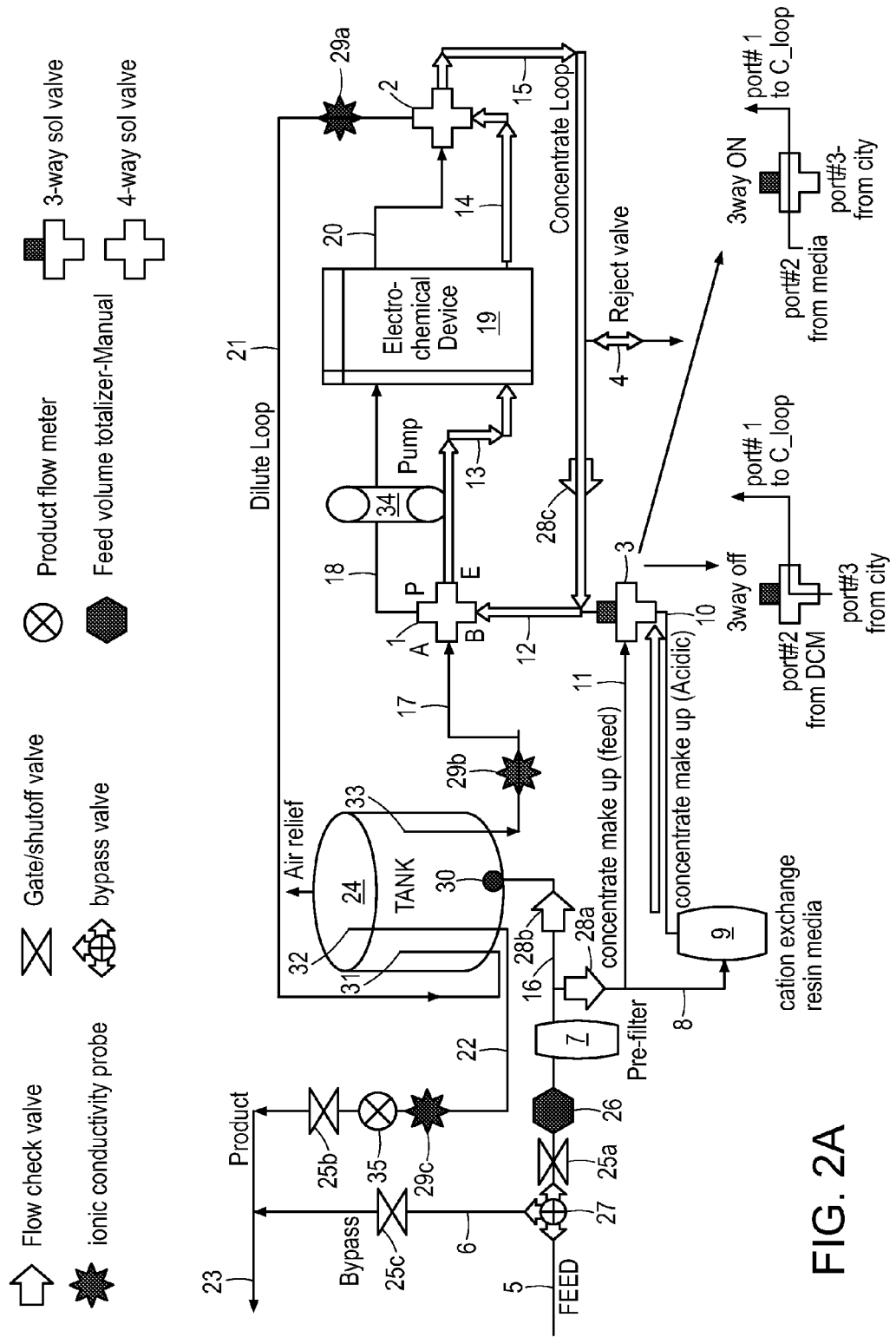
FIG. 2A is the process flow diagram depicted in FIG. 2, with bold lines highlighting a particularly treated liquid flow path in accordance with one or more embodiments of the systems and methods described herein.

FIG. 2A is the process flow diagram depicted in FIG. 2, with bold lines highlighting the liquid flow path encompassing the recirculating concentrate loop where the concentrate loop make-up water comprises acidic water exiting the cation exchange resin. When ionic conductivity probe 29b senses a conductivity value above a certain predetermined value, for example, above about 400 µS/cm, then the recirculating concentrate loop make-up water comprises water from acidic liquid stream 10. When ionic conductivity probe 29b senses a conductivity value below a certain predetermined value, for example, below about 400 µS/cm, then the recirculating concentrate loop make-up water comprises water from feed make-up water stream 11. A liquid circuit is illustrated where fluid comprising the exiting concentrate stream from one or more outlets of electrochemical water treatment device 19 enters conduit 14 and a second port of four-way solenoid valve 2. The concentrate stream exits a first port of valve 2 and enters conduit 15. Conduit 15 is in fluid communication with a first port of three-way solenoid valve 3 and conduit 12. In this embodiment, three-way solenoid valve 3 functions to allow the recirculating concentrate loop make-up water to comprise the acidic liquid stream 10 exiting from cation exchange resin device 9. The acidic concentrate loop make-up water exits the first port of valve 3 and enters conduit 12, where it is further directed to a second port of four-way solenoid valve 1. The concentrate stream exits a first port of valve 1 to conduit 13 where it feeds into one or more inlets of electrochemical water treatment device 19. This arrangement can provide treated water, low conductivity and low TDS/total hardness to one or more electrode compartments and/or one or more depleting compartments of electrochemical water treatment device 19 which communicates to storage system 24 through conduit 21. This arrangement can also recycle concentrate water, high conductivity and high TDS/total hardness to one or more concentrating compartments of electrochemical water treatment device 19. The liquid circuit can be arranged so that the fluid flow paths can be in series or in parallel through the electrode and/or concentrating compartments. Additionally, the liquid circuit can be arranged so that when reject valve 4 is opened, acidic water exiting the cation exchange resin device is in fluid communication with the waste stream. This allows for acidic concentrate loop make-up water to comprise at least some portion of the waste stream, resulting in reduced scale formation.

In certain aspects, a controller, through one or more sensors, can monitor and/or measure a water property of the water in storage system 24 and also monitor and/or measure a flow rate or water property of liquid flowing in product stream 23 and subsequently adjust an operating parameter of electrochemical water treatment device 19 and/or valves 1, 2 and 3 based on the measured properties. For example, when the conductivity of the storage system reaches a value of above 400 µS/cm, then the controller can actuate valve 3 to the "on" position to allow acidic fluid stream 10 to comprise the concentrate loop make-up water. In addition, when the conductivity of water in the storage system is below 400 µS/cm, then the controller can actuate valve 3 to the "off" position to allow feed make-up stream 11 to comprise the concentrate loop make-up water.

Figure 2B:
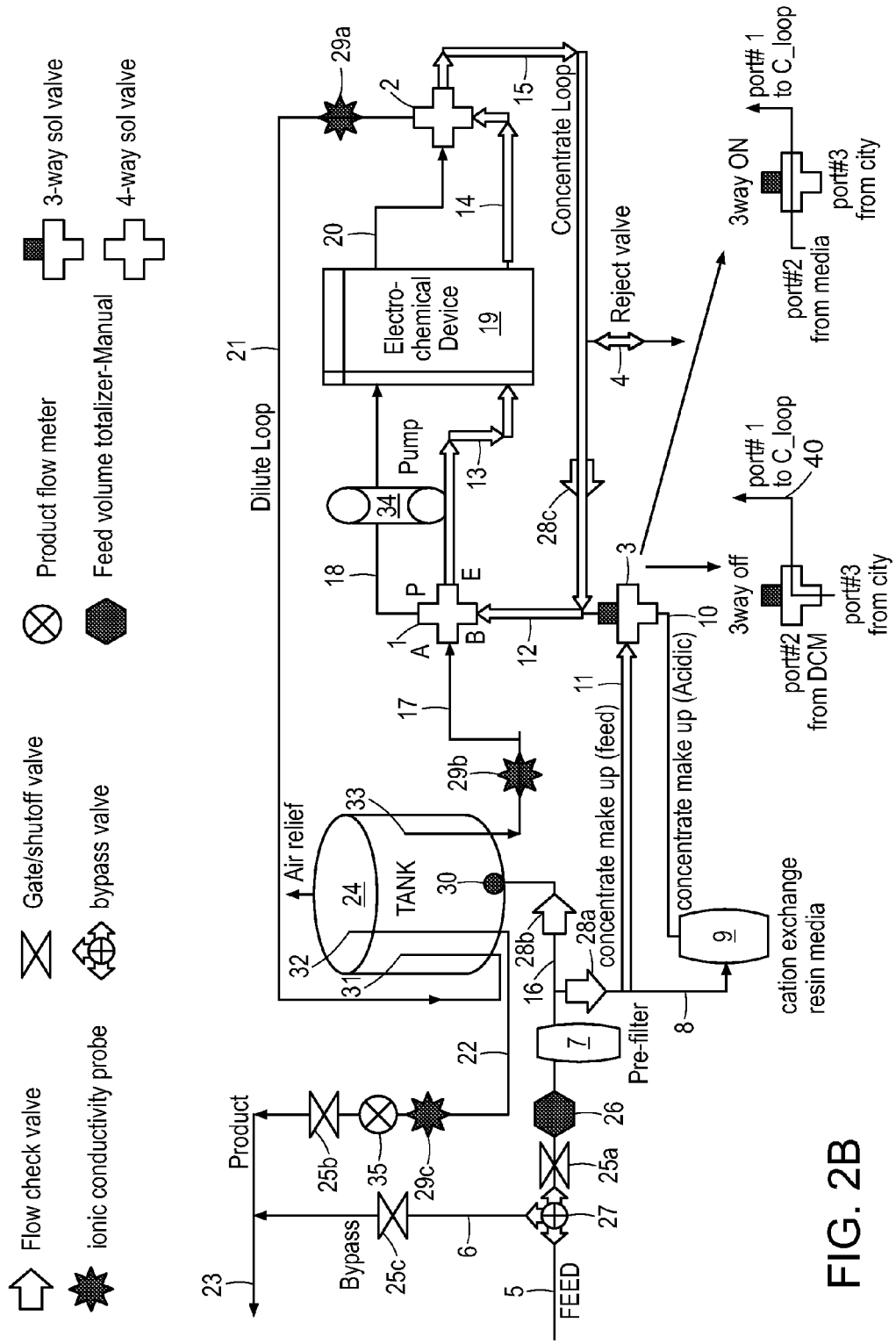
FIG. 2B is the process flow diagram depicted in FIG. 2, with bold lines highlighting a particularly treated liquid flow path in accordance with one or more embodiments of the systems and methods described herein.

FIG. 2B is the process flow diagram depicted in FIG. 2, with bold lines highlighting a liquid flow path where cation exchange resin device 9 is bypassed. In this embodiment, three-way solenoid valve 3 functions to bypass the acidic fluid stream 10 exiting cation exchange resin 9 and allow the recirculating concentrate loop make-up water to comprise feed water from fluid stream 11. This arrangement can function to provide for flushing the concentrate loop at the end of one or more treatment cycles, and, additionally, prior to a reverse cleaning cycle, thereby conserving the exchange capacity of the cation exchange resin device.

Flushing of the concentration loop can be performed by transferring the feed make-up stream 11 through solenoid valve 3 and solenoid valve 1 and then through the electrode and/or concentrating compartments of electrochemical water treatment device 19. Flushing may be performed so that fluid flow paths can be in series or in parallel through the electrode and/or concentrating compartments. Additionally, treated water, from storage system 24, can be directed through conduit 17, valve 1, and conduit 18 before entering electrochemical water treatment device 19. In this way, treated water may be used in addition to the feed water to flush the concentrate stream.

Cation exchange device 9 may also be bypassed to accommodate situations where acidic water is otherwise not needed for the concentrate make-up water. In certain embodiments, when water stored in storage system 24 possesses a conductivity value that falls below a predetermined value, for example, at about 400 µS/cm, acidic water does not need to be added, because at low concentrations, the removal rates in the electrochemical water treatment device are lower, and feed water is therefore sufficient to keep the LSI of the recirculating concentrate stream below a value of 1.2. This also serves to conserve the exchange capacity of the cation exchange resin. In this situation, when water in storage system 24 possesses a conductivity value that goes above a predetermined value, for example 400 μS/cm, then the acidic liquid exiting the cation exchange resin device may be added to the concentrate loop on a limited basis, for example, in lowering the acidity, and subsequently the LSI, of the waste stream. After this period of limited use, the cation exchange device is bypassed, and the concentrate make-up water comprises feed water from fluid stream 11.

The cation exchange resin device 9 may also be bypassed to accommodate a "safe mode" situation. For example, the cation exchange resin may be depleted, and in need of service. In certain instances, a sensor, for example, an RFID antenna will sense the state of the exchange resin and communicate the information to a control system. The control system can, for example, then power off three-way solenoid valve 3 so that feed stream 11 comprises the make-up water of the concentrate stream. In certain non-limiting embodiments of the systems and methods disclosed here, yield recovery rates are from about 80 to about 85%. In certain non-limiting embodiments, the yielded recovery rates are greater than 90%. In certain other embodiments, a timer or a flow meter may be used to determine the availability and/or capacity of the cation exchange media.

In accordance with further embodiments of the systems and methods described herein, both feed make-up water 11 and acidic make-up water 10 are allowed to flow into the recirculating concentrate stream at a certain ratio. This can be accomplished, for example, by using a flow restrictor in place of the three-way solenoid valve. The flow restrictor allows for variation and control of the ratio between feed make-up water and acidic make-up water in the concentrate stream, for example, 20% from the acidic make-up stream with 80% from the feed make-up stream, or 50% from the acidic make-up stream with 50% from the feed make-up stream.

In accordance with further embodiments of the systems and methods described herein, disinfecting and/or cleaning apparatus components may be utilized with the treatment system. Such disinfecting or cleaning systems can comprise any apparatus that destroys or renders inactive, at least partially, any microorganisms, such as bacteria, that can accumulate in any component of the treatment system. Examples of cleaning or disinfecting systems include those that can introduce a disinfectant or disinfecting chemical compounds, such as halogens, halogen-donors, acids or bases, as well as systems that expose wetted components of the treatment system to hot water temperatures capable of sanitization. In accordance with still further embodiments of the systems and methods described herein, the treatment system can include final stage or post treatment systems or subsystems that provide final purification of the fluid prior to delivery at a point of use. Examples of such post treatment systems include, but are not limited to those that expose the fluid to actinic radiation or ultraviolet radiation, and/or ozone or remove undesirable compounds by microfiltration or ultrafiltration. Thus, in accordance with one or more embodiments of the systems and methods described herein, the treatment system may be utilized for household service and installed, for example, under a sink and provide treated water, which is treated by exposure to ultraviolet radiation, before being delivered to a point of use, such as a faucet.

In accordance with further embodiments of the invention, the treatment system can comprise systems and techniques that permit disinfection of any component of the treatment system. For example, the treatment system can be exposed to a disinfecting solution or a disinfectant. The disinfectant can be any material that can destroy or at least render inactive at least a portion of any viable microorganisms, such as bacteria, present in any component or subsystem of the treatment system. Examples of a disinfectant can include any base, acid, or sanitizer, such as a halogen or halogen-donating compounds, peroxygen or peroxygen-donating compounds that destroy or render bacteria inactive. The disinfectant can be introduced into the treatment system by any suitable device or technique. For example, chlorine can be introduced into the storage system. Chlorine can be introduced by injection of a hypochlorate species from a disinfectant reservoir fluidly connectable to any suitable portion of the treatment system. The chlorinated water can be further circulated through at least a portion of the treatment system thereby exposing wetted portions of the system to the disinfectant.

In accordance with another embodiment, discharge water comprising, for example, water exiting reject valve 4, can be used for auxiliary purposes to serve or provide additional or secondary benefits. For example, discharge water may be used to provide, for example, irrigating water to residential, commercial, and industrial uses, for example, for irrigating, for recycling, or for recovery of collected or concentrated salts.

In yet another embodiment, the treatment system includes a mixing system that is fluidly connected to at least one of a fluid distribution system and a storage system. The mixing or blending system can include one or more connections in the fluid distribution system as well as connections to a feed stream. The mixing system can provide fluid mixing of, for example, untreated water with treated water to produce service water that can be fed to the product stream. For example, the mixing system can comprise at least one tee, a mixing tank and/or chamber, or both, that fluidly connects an outlet of the storage system and the feed stream. The mixing system, in some cases, can include a valve that regulates the flow of any of the untreated water streams, treated water streams, and any other stream flowing to the product streams. In another embodiment, the valve can be a proportional valve that mixes the treated water with untreated water according to a predetermined ratio. In another embodiment, the valve can be actuated by a controller depending based on, for example, the flow rate, the water property, and the particular service associated with the product stream. For example, if low hardness water is required for the product stream, then the controller can regulate the amount of untreated water, if any, that can be mixed with treated water by actuating a valve, which regulates the flow rate of the untreated water, in closed-loop control with a sensor measuring the conductivity of the mixed water stream. In another embodiment, the valve can regulate the flow rate of the treated water that would be mixed with the untreated water according to the requirements of the product stream. In another embodiment, the treatment device can be operated to reach a set-point that is lower than any required by one or more product streams so that any mixing of treated water with untreated water can produce service water that satisfies the particular requirements of each product stream. Those of ordinary skill should recognize that the treatment system can be adjustable to accommodate fluctuations in demand as well as variations in water quality requirements. For example, the systems and methods described herein can produce low LSI water, which would be available to the treatment system as a whole, during extended idle periods. The low LSI water, in some embodiments, can be used to flush the wetted components of the treatment system, which can reduce the likelihood of scaling and should increase the service life of the individual components, as well as the treatment system as a whole. In accordance with some embodiments, the systems and methods described herein provide for producing treated liquids, such as water, having a low conductivity. The treatment system can comprise a fluid circuit that provides treated or, in some cases, softened water or, in other cases, low conductivity water, and/or low LSI water, to an electrode compartment of the electrochemical water treatment device.

In another embodiment of the systems and methods described herein, treatment system 40 comprises one or more flow regulators for regulating liquid flow. For example, a flow regulator can regulate the amount or volume of fluid discharging from reject valve 4 into a waste stream. According to another embodiment of the systems and methods described herein, the flow regulator is a valve that can be intermittently opened and closed according to a predetermined schedule for a predetermined period of time to allow a predetermined volume to flow. The amount or volume of flowing fluid can be adjusted or changed by, for example, changing the frequency the flow regulator is opened and closed, or by changing the duration during which the flow regulator is open or closed. In one embodiment, the flow regulator can be controlled or regulated by a controller, through, for example, an actuation signal. Thus, in one embodiment of the invention, the controller provides an actuation signal, such as a radio, current or a pneumatic signal, to an actuator, with, for example, a motor or diaphragm that opens and closes the flow regulator. The fluid regulated by a valve or flow regulator can be any fluid in any circuit or stream in treatment system 40.

In one or more non-limiting embodiments, the cation exchange resin device may be used to modify one or more properties of feed water, such as lowering the pH. In addition, one or more measured properties of the feed water may be used to determine one or more properties of the recirculating concentrate loop, for example, the LSI. In certain embodiments, the use of the acidic or feed make-up stream in the recirculating concentrate stream controls properties of the water in the recirculating concentrate stream, for example, by lowering the LSI. Other arrangements and combinations, for example, controlling one or more properties of the recirculating concentrate stream based on measured properties of both the feed water and the water contained in the storage system, are considered to be within the scope of the systems and methods described herein.

EXAMPLES

The systems and methods described herein will be further illustrated through the following examples, which are illustrative in nature and are not intended to limit the scope of the disclosure.

Example 1

A treatment system in accordance with one or more embodiments of the systems and techniques described herein, shown schematically in FIG. 2, was evaluated for performance against a control treatment system, shown schematically in FIG. 1. A comparison study was conducted to evaluate the volume of waste water produced in cleaning a 15 gallon volume of feed water. The systems were also evaluated for their ability to maintain a low LSI (<1.2) in the recirculating concentrate stream. The feed streams for both systems were identical in composition, having a TDS level of about 550 ppm, a hardness of 20 gpg, and a pH of about 7.4. The total tank volume was 30 gallons and the initial conductivity of the water was about 958 oS/cm.

Water was treated by a CEDI device under the following conditions:
Module: HydroDI™ Series number HN109 available from Hydronovation Inc.
25 cell pairs—low flow small stack with continuous duty
Compartment size: 3"×11"
Applied voltage: 50 Volts (DC)
Recirculating concentrate and product discharge flow rate: 1 gallon/minute
Recirculating concentrate LSI: 1.4
Waste/reject continuous discharge flow rate: less than 3 gallons/minute Water was treated by a cation exchange resin device under the following conditions: 20"×4.5" Cation H+ form filter cartridge (strong acid cation filter cartridge) (AQUALINE™ Industrial Series SACBB20H, manufactured by Systematix USA). The ionic conductivity probe used in the treatment systems corresponded to a Mettler Toledo Conductivity Sensor Model type 200. The three-way solenoid valve used corresponded to an ASCO® Model type 8320G196. When the measured conductivity of water in the tank rose above a value of 400 μS/cm, then the concentrate loop make-up water came from the acidic make-up stream. Conversely, when the measured conductivity of water in the tank fell below a value of 400 μS/cm, then the concentrate loop make-up water came from the feed make-up stream. The end point of the test run was set at 180 μS/cm, which is equivalent to about 4 gpg. On average, the amount of time necessary to achieve these results was about two hours.

Figure 3:
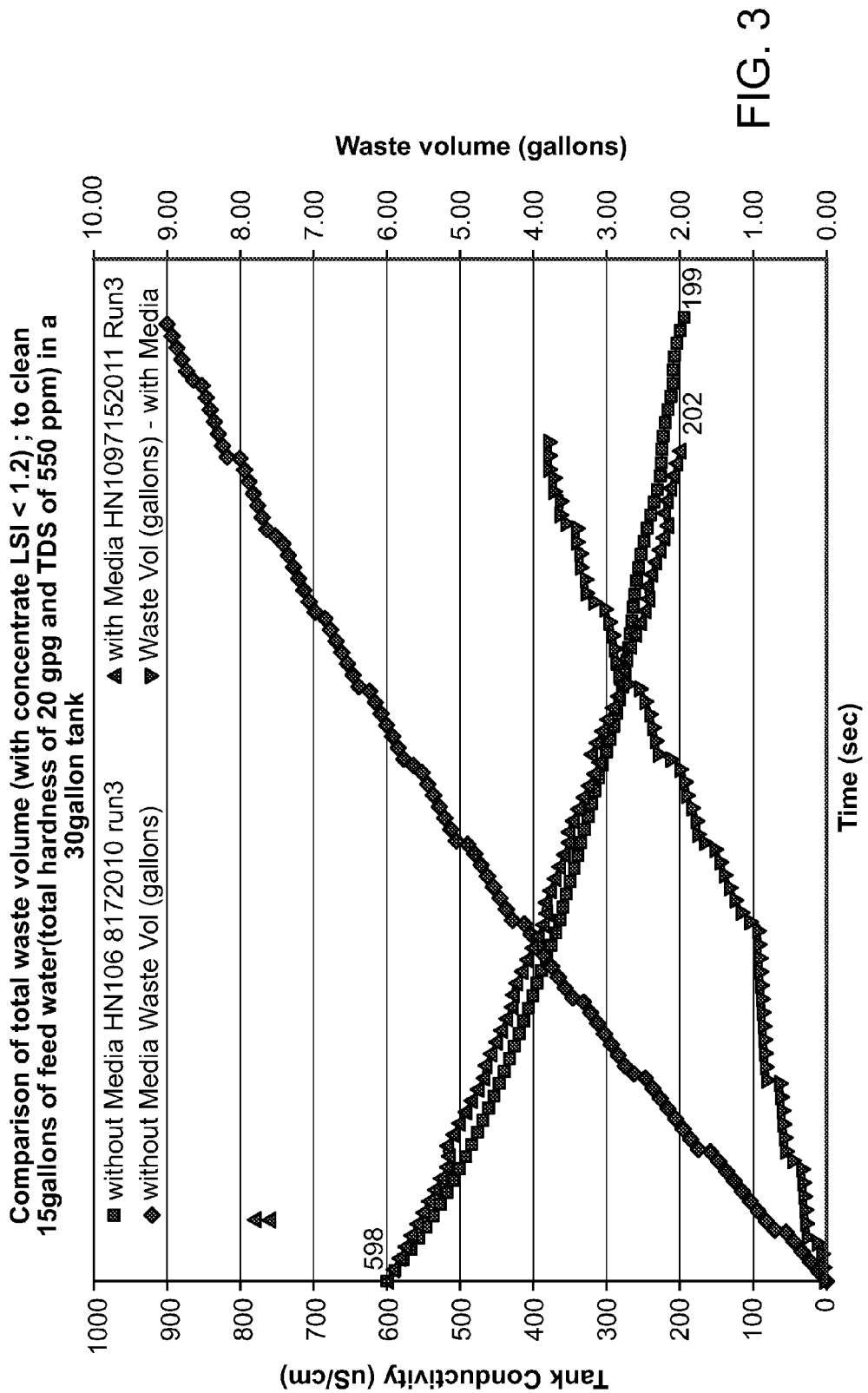
FIG. 3 is a graphical illustration of a comparison study performed between a treatment system in accordance with one embodiment of the systems and methods described herein and a control treatment system.

FIG. 3 graphically illustrates the waste water volume for the two treatment systems (corresponding to process flow diagrams depicted in FIG. 2 and FIG. 1, respectively). The left Y-axis and corresponding curves indicate the change in tank water conductivity over the course of the experiment for both treatment systems. The right Y-axis and corresponding curves indicate the volume of waste water produced during the test run.

Recovery rates without the use of the cation exchange resin media were 62.5% (corresponding to a waste volume of 9 gallons), while use with the cation exchange media yielded recovery rates of about 80% (corresponding to a waste volume of 3.9 gallons). It is estimated that recovery rates in excess of 90% is achievable.

The results indicate that when no resin media is available, maintaining low LSI in the concentration loop requires higher volumes of rejected waste water to be produced. In comparison, the presence of the three-way solenoid valve allowed for the system to bypass the exchange media (and therefore the recirculating concentrate stream make-up water is from the feed line) when the tank conductivity dropped below 400 μS/cm.

Example 2

System Yield Tests for Example 2
A treatment system in accordance with FIG. 1 was optimized by implementing the use of an algorithm to control the opening and closing of reject valve 4. The algorithm took into account the conductivity of water in the tank 24, the ion removal rate of electrochemical water treatment device 19, the physical properties of feed stream 5, and the target ion concentration in the recirculating concentrate loop water (determined at the end of 15 minute cycles). When reject valve 4 opened, it allowed a portion of the concentrate loop to drain to waste. At the same time, the concentrate loop was replenished by feed concentrate make-up water 11. Experiments were conducted using both hard and soft feed concentrate make-up water.

A simple time-based algorithm was implemented where the reject valve was open for 3.3 seconds and then closed for 26.7 seconds, without taking into account the conductivity of the feed, the ion removal rate of the electrochemical water treatment device, or the conductivity of the tank water. The time-based algorithm resulted in the LSI value of the concentrate loop varying from 1.4 (corresponding to water conductivity in the tank increasing above a value of 400 $\mu$S/cm) to 0.8 (corresponding to water conductivity in the tank decreasing below a value of 400 $\mu$S/cm). The time-based algorithm yielded a recovery rate of 50%, regardless of hard or soft water feed.

The simple time-based algorithm was compared against an algorithm that took into account the conductivity of water in tank 24, the ion removal rate of electrochemical water treatment device 19, the physical properties of feed stream 5, and the target ion concentration in the concentrate-loop. This multi-factor algorithm resulted in the LSI value of the concentrate loop maintaining a value of approximately 1.2 (corresponding to water conductivity in the tank being about 400 $\mu$S/cm). The multi-factor algorithm increased the recovery rate to a value of 64%.

In another study, a soft water (mixed-bed resin) exchange device was configured to treat the feed concentrate make-up water. The hardness ions of the incoming feed were exchanged for Na+, but the soft water exchange device did not have an effect on the pH of the concentrate stream, and therefore there were no significant changes to the LSI values of the concentrate loop water.

Another study was conducted where a weak acid cation exchange resin device was configured to treat the feed concentrate make-up water. This set-up is useable for certain feed water types.

A further study was conducted where tank water was used as the concentrate loop make-up water. The results showed no significant improvement in system recovery or yield, and, in fact, the treatment system had to run for a longer duration to clean the same amount of water. Without being bound by theory, this type of set-up may be useful in other applications, for example, when the feed has high hardness characteristics.

Example 2 Test Run

A strong acid cation exchange resin device was used to acidify feed water, which was subsequently used as make-up water for the recirculating concentrate loop. A water treatment system in accordance with FIG. 2 and comprising cation exchange device 9 (AQUALINE™ Industrial Series strong acid cation exchange cartridge Big Blue 20"×4.5") was used to produce acidic concentrate make-up water and was placed in fluid communication with three-way solenoid valve 3. Three-way solenoid valve 3 was configured to operate so that when reject valve 4 was opened, acidic water 10 from cation exchange device 9 entered the concentrate loop, thereby lowering pH and maintaining low LSI values. Check valves 28a, 28b, and 28c were configured to allow for the directional control of flow, but may not be required in alternative set-ups. In addition, a recirculating dilution stream exits from tank 24, enters conduit 17 and travels through valve 1, conduit 18, and electrodeionization device 19 before exiting out conduit 20 and entering valve 2 to conduit 21. Ions from the dilution stream are pulled into the recirculating concentration loop.

Figure 4:
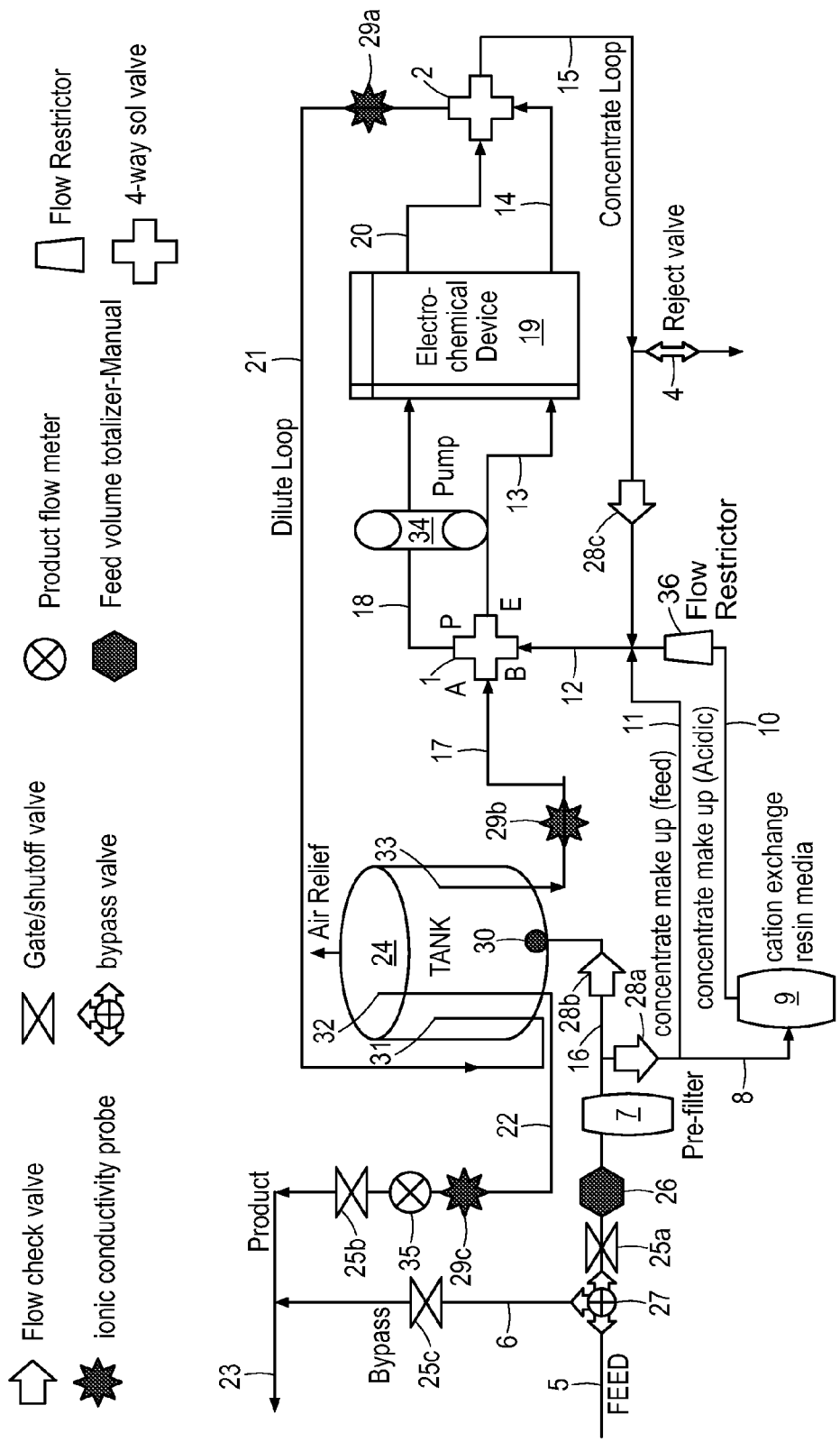
FIG. 4 is a process flow diagram of a treatment system in accordance with one or more embodiments of the systems and methods described herein.

FIG. 4 illustrates an alternative water treatment system, similar to FIG. 2, but with cation exchange device 9 fluidly connected to flow restrictor 37 (a multi-turn gate valve). This method of treatment allowed for both feed make-up water 11 and acidic make-up water 10 to flow into the recirculating concentrate stream at a fixed ratio. Flow restrictor 37 allowed for variation and control of the ratio between feed make-up water and acidic make-up water, for example, 20% from the acidic make-up stream and 80% from the feed make-up stream, or 50% from the acidic make-up stream and 50% from the feed make-up stream. The amount of exchanged (H+) water and the amount of feed water (water that bypassed the cation exchange device) that was fed into the concentrate loop was determined by an inline water volume totalizer. The feed stream had the following composition: a TDS level of 550 ppm, a pH value of 7.3-7.4, a hardness value of about 20 gpg, and an alkalinity value of 200 ppm. The total tank volume was 24 gallons, using a baffle-type tank.

Water was treated in an electrochemical deionization device under the following conditions:
Module: HydroDI™ Series number HN108 available from Hydronovation Inc.
Module size: 25 cell pairs
Cell area of the module: 9"×2.5"
Applied voltage: 50 Volts (DC)
Recirculating concentrate and product discharge flow rate: 1 gallon/minute Several physical properties, for example, pH, TDS, conductivity, and temperature of the recirculating concentrate loop water were calculated at the end of 15 minute cycles using a flush sample. During the 15 minute cycle, ions from the dilution stream were pulled into the concentrating stream. After 15 minutes, the concentrating stream was flushed with feed water, which has lower conductivity and hardness values when compared to the recirculating concentrating stream. A normal flush was about 12 seconds in duration with an accompanying flow rate out of reject valve 4 being about 1 gallon/minute. Flushing of the ion-concentrating side of electrochemical water treatment device 19 is required before polarity is reversed in order to prevent contamination of water contained in storage tank 24 with high concentrate water. The measurements taken at the end of the 15 minutes cycle were used to determine the LSI of the recirculating concentrate loop. The system yield/recovery was determined once the entire tank volume reached the desired target conductivity level of about 180 $\mu$S/cm. Waste water volume was measured when determining the system yield/recovery performance. The product volume was fixed to 15 gallons, and the reject opening sequence was programmed to maintain a system yield rate of 72.5%.

Figure 5:
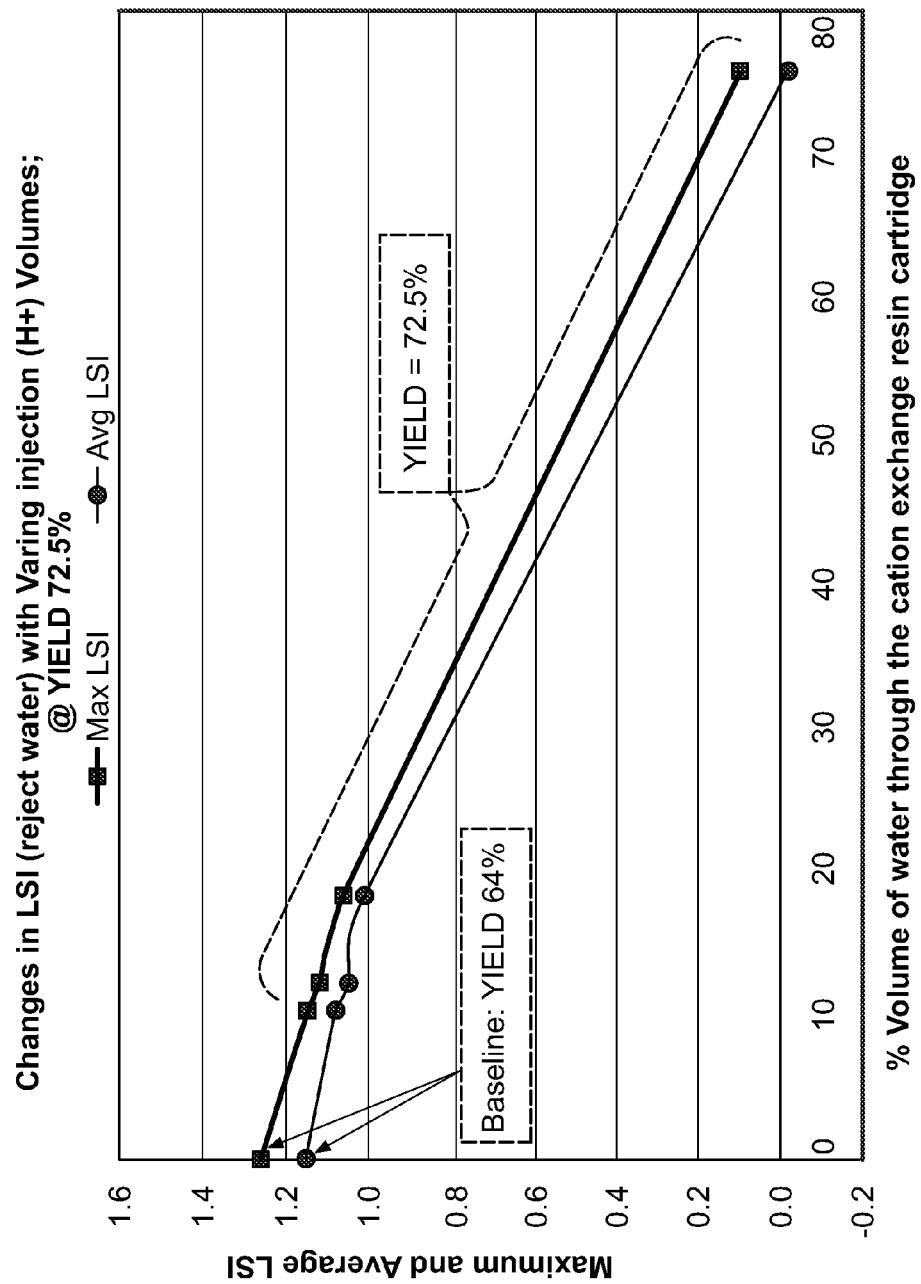
FIG. 5 is a graphical illustration of an optimization study performed on one or more embodiments of the systems and methods described herein.

A baseline test was performed and the results showed that the system yield/recovery of the water treatment system without the use of the cation exchange device (and strong acid resin) was about 64% with LSI values of about 1.2-1.3. The standard operating point for the LSI value in the concentrate loop was about 1.2. The baseline test was compared against a water treatment system illustrated in FIG. 4, where flow restrictor 37 was used to vary the ratio of feed water to H+ exchanged water in the concentrate loop make-up water. FIG. 5 graphically illustrates the effect that increasing the volume of acidic make-up water had on the LSI of the reject water. The Y-axis corresponds to the maximum and average calculated LSI values, and the X-axis corresponds to the amount of water (percent volume of total waste) that entered the concentrate loop from the cation exchange device in each 15 minute run. The maximum LSI was calculated based on the three highest pH/TDS readings taken during the 15 gallon test. The results show that by supplying the concentrate loop with low pH water, the concentrate loop LSI could be dramatically reduced.

FIG. 5 shows the relation between recirculating concentrate loop LSI and the composition of the feed water when the system yield was fixed at 72.5% and LSI was allowed to vary. The results indicate that the LSI of the recirculating concentrate loop water could be controlled by changing the amount of acidic water that entered the concentrate loop, while not increasing the volume of waste water or the module cleaning rate. This is exhibited in the figure by LSI values being forced to zero (and below) and keeping system yield at 72.5%. The results indicate that a system yield of 72.5% and an LSI value of 1.2 could be achieved when 20% of the recirculating concentrate loop make-up water was from the cation exchange device. In addition, when 80% of the make-up water was from the cation exchange device, the LSI value dropped to zero (while still maintaining a system yield of 72.5%). The advantage of the low LSI value is that the module can be maintained in a non-scaling environment, and thereby dramatically reduce the possibility of scale formation in not only the module, but other system components as well, for example, valves and pipes.

Subsequent experiments were conducted using the set-up shown in FIG. 2. A system yield of 75% and LSI values of 1.2-1.3 were achieved when 20% of the concentrate loop make-up water came from the cation exchange device. It is estimated that recovery in excess of 80% is achievable while still maintaining an LSI value of 1.2. A system yield of 93% was achieved (corresponding to 15 gpg) when 100% of the concentrate loop make-up water came from the cation exchange device. When necessary, the acidic water from the cation exchange device can be used to stabilize or de-scale the module. The acidic water is capable of removing certain organics from the membranes and resin in the module, thereby preventing build-up of these contaminants. Module cleaning can be done, for example, on demand, or can be programmed to occur upon a triggering event, for example, based upon system performance and operating parameters.

The increase in system yields mean that a significantly lower number of activation cycles are necessary for the reject valve and the three-way solenoid valve, since longer cycle times are not linked to a reject sequence, as has been the case in other treatment systems.

The use of the cation exchange resin may also be used with ED (electro-dialysis) modules and may also be applicable for other hardness removing systems, where membrane and scaling in system components is an issue, for example, in capacitive deionization treatment systems. Additionally, to reduce resin use, the flush at the end of each cycle can be configured to simply bypass the cation exchange device. The cation exchange device can also be bypassed to provide a "safe mode," for situations where the strong acid resin media is either not present, or is exhausted beyond use. In this "safe mode," system yield would revert back to a value of about 65%.

Those skilled in the art should appreciate that the parameters and configurations described herein are exemplary and that actual parameters and/or configurations will depend on the specific application in which the various embodiments of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of the appended claims and equivalents thereto; the invention may be practiced otherwise than as specifically described.

What is claimed is:

1. A water treatment system comprising:
an electrochemical water treatment device;
a recirculating concentrate stream in fluid communication with a first inlet and a first outlet of the electrochemical water treatment device;
a recirculating dilution stream in fluid communication with a second inlet and a second outlet of the electrochemical water treatment device;
a conductivity sensor in communication with the recirculating dilution stream and positioned downstream from the second outlet of the electrochemical water treatment device, the conductivity sensor configured to measure a conductivity of the recirculating dilution stream;
an acidic liquid stream comprising an acidic water generated from a feed water;
a feed stream comprising the feed water;
a flow control device disposed both between the recirculating concentrate stream and the acidic liquid stream and between the recirculating concentrate stream and the feed stream, the flow control device configured to control the flow of the acidic water and the flow of the feed water to the recirculating concentrate stream; and
a control system in communication with the flow control device and configured to regulate power to the flow control device such that the control system controls the flow of the acidic water and the flow of the feed water to the recirculating concentrate stream based at least in part on the measured conductivity of the recirculating dilution stream.

2. The system of claim 1, further comprising a cation exchange resin device in fluid communication with the acidic liquid stream such that the cation exchange resin generates the acidic water from the feed water.

3. The system of claim 1, wherein the control system is configured to regulate power to the flow control device such that the acidic water is added to the recirculating concentrate stream when the measured conductivity is greater than about 400 µS/cm.

4. The system of claim 1, further comprising a storage system having a first inlet in fluid communication with the second outlet of the electrochemical water treatment device, a second inlet in fluid communication with the feed stream, and an outlet in fluid communication with the second inlet of the electrochemical water treatment device.

5. The system of claim 4, wherein the conductivity sensor is a first conductivity sensor and the system further comprises a second conductivity sensor in communication with the outlet of the storage system and positioned between the outlet of the storage system and the second inlet of the electrochemical water treatment device.

6. The system of claim 5, wherein the control system is configured to regulate power to the flow control device based on a measured conductivity of the second conductivity sensor.

7. The system of claim 6, wherein the control system is configured to regulate power to the flow control device such that the acidic water is added to the recirculating concentrate stream when the measured conductivity of the second conductivity sensor is greater than about 400 μS/cm.

8. The system of claim 7, wherein the control system is configured to regulate power to the flow control device such that the feed water is added to the recirculating concentrate stream when the measured conductivity of the second conductivity sensor is less than about 400 μS/cm.

9. The system of claim 4, further comprising a conductivity sensor positioned within the storage system, and the control system is configured to regulate power to the flow control device based on a measured conductivity of the conductivity sensor positioned within the storage system.

10. The system of claim 1, wherein the control system is configured to regulate power to the flow control device such that acidic water of the acidic liquid stream is bypassed to provide a safe mode such that feed water of the feed stream comprises the recirculating concentrate stream.

11. The system of claim 1, having a system yield greater than 80%.

* * * * *